(12) United States Patent
Berrada et al.

(10) Patent No.: US 12,354,623 B2
(45) Date of Patent: Jul. 8, 2025

(54) ENGAGEMENT MEASUREMENT OF MEDIA CONSUMERS BASED ON THE ACOUSTIC ENVIRONMENT

(71) Applicant: The Nielsen Company (US), LLC, New York, NY (US)

(72) Inventors: Meryem Berrada, Clearwater, FL (US); John Stavropoulos, Edison, NJ (US)

(73) Assignee: The Nielsen Company (US), New York, NY (US)

( * ) Notice: Subject to any disclaimer, the term of this patent is extended or adjusted under 35 U.S.C. 154(b) by 0 days.

(21) Appl. No.: 18/349,796

(22) Filed: Jul. 10, 2023

(65) Prior Publication Data

US 2024/0079026 A1   Mar. 7, 2024

Related U.S. Application Data

(63) Continuation of application No. PCT/US2022/011652, filed on Jan. 7, 2022, and a continuation of application No. 17/571,261, filed on Jan. 7, 2022.

(60) Provisional application No. 63/135,389, filed on Jan. 8, 2021.

(51) Int. Cl.
   *G10L 25/00*    (2013.01)
   *G10L 15/06*    (2013.01)
   *G10L 15/08*    (2006.01)
   *G10L 15/22*    (2006.01)
   *G10L 25/51*    (2013.01)

(52) U.S. Cl.
   CPC ............ *G10L 25/51* (2013.01); *G10L 15/063* (2013.01); *G10L 15/08* (2013.01); *G10L 15/22* (2013.01); *G10L 2015/088* (2013.01)

(58) Field of Classification Search
   CPC ......... G10L 25/51; G10L 15/22; G10L 15/08; G10L 15/063
   See application file for complete search history.

(56) References Cited

U.S. PATENT DOCUMENTS

| | | |
|---|---|---|
| 5,481,294 A | 1/1996 | Thomas |
| 9,332,363 B2 | 5/2016 | Jain |
| 10,783,434 B1 | 9/2020 | Mitchell et al. |

(Continued)

OTHER PUBLICATIONS

United States Patent and Trademark Office, "Non-Final Office Action," issued in connection with U.S. Appl. No. 17/962,335, mailed on Oct. 4, 2023, 12 pages.

(Continued)

*Primary Examiner* — Rasha S Al Aubaidi

(57) ABSTRACT

Methods, apparatus, systems and articles of manufacture to measure engagement of media consumers based on acoustic environment are disclosed. Example apparatus disclosed herein are to identify media device audio data and ambient environment audio data from sensed audio data collected from an environment, and determine classification data for the media device audio data and the ambient environment audio data. Disclosed example apparatus are also to process the classification data with a machine learning model to calculate an engagement metric. Disclosed example apparatus are further to determine whether at least one individual is engaged with media in the environment based on the engagement metric.

18 Claims, 12 Drawing Sheets

(56) References Cited

U.S. PATENT DOCUMENTS

| | | |
|---|---|---|
| 2009/0307084 A1 | 12/2009 | Monighetti et al. |
| 2013/0019258 A1 | 1/2013 | Bhatia et al. |
| 2013/0202128 A1 | 8/2013 | Jain et al. |
| 2014/0337873 A1 | 11/2014 | Krug |
| 2015/0106830 A1 | 4/2015 | Ramaswamy et al. |
| 2015/0128159 A1 | 5/2015 | Weinblatt |
| 2015/0142953 A1* | 5/2015 | Bayen ............ G06F 11/34 709/224 |
| 2016/0154625 A1 | 6/2016 | Stout |
| 2018/0077286 A1* | 3/2018 | Raanani ............ G10L 17/02 |
| 2018/0096271 A1* | 4/2018 | Raanani ............ G06N 20/00 |
| 2019/0019521 A1 | 1/2019 | Lynch et al. |
| 2019/0188756 A1 | 6/2019 | Bradley et al. |
| 2019/0355350 A1 | 11/2019 | Jeyachandran et al. |
| 2021/0224316 A1 | 7/2021 | Waye |
| 2022/0270453 A1 | 8/2022 | Werner et al. |
| 2023/0217071 A1 | 7/2023 | Topchy |

OTHER PUBLICATIONS

International Preliminary Report on Patentability received in PCT Application No. PCT/US2022/011652, issued on Jul. 4, 2023, 6 pages.

United States Patent and Trademark Office, "Non-Final Office Action", issued in connection with U.S. Appl. No. 17/571,261, filed Feb. 14, 2024, 8 pages.

\* cited by examiner

ENGAGEMENT MEASUREMENT OF MEDIA CONSUMERS BASED ON THE ACOUSTIC ENVIRONMENT

CROSS-REFERENCE TO RELATED APPLICATIONS

This patent is a continuation of International Patent Application No. PCT/US22/11652, filed Jan. 7, 2022, and a continuation of U.S. patent application Ser. No. 17/571,261, also filed Jan. 7, 2022, each of which claims the benefit of U.S. Provisional Patent Application No. 63/135,389, which was filed on Jan. 8, 2021. International Patent Application No. PCT/US22/11652; U.S. patent application Ser. No. 17/571,261; and U.S. Provisional Patent Application No. 63/135,389 are each hereby incorporated herein by reference in their entireties. Priority to International Patent Application No. PCT/US22/11652; U.S. patent application Ser. No. 17/571,261; and U.S. Provisional Patent Application No. 63/135,389 is hereby claimed.

FIELD OF THE DISCLOSURE

This disclosure relates generally to audience measurement, and, more particularly, to engagement measurement of media consumers based on the acoustic environment.

BACKGROUND

Audience measurement entities (AMEs), such as The Nielsen Company (US), LLC, may extrapolate audience viewership data for a media viewing audience. AMEs may collect audience viewership data via portable monitoring devices to gather research data. For example, portable monitoring devices are able to collect data from the environment during the day, which may include audience viewership data, such as data characterizing exposure to media data and/or other market research data.

BRIEF DESCRIPTION OF THE DRAWINGS

In general, the same reference numbers will be used throughout the drawing(s) and accompanying written description to refer to the same or like parts. The figures are not to scale.

Figure 1:
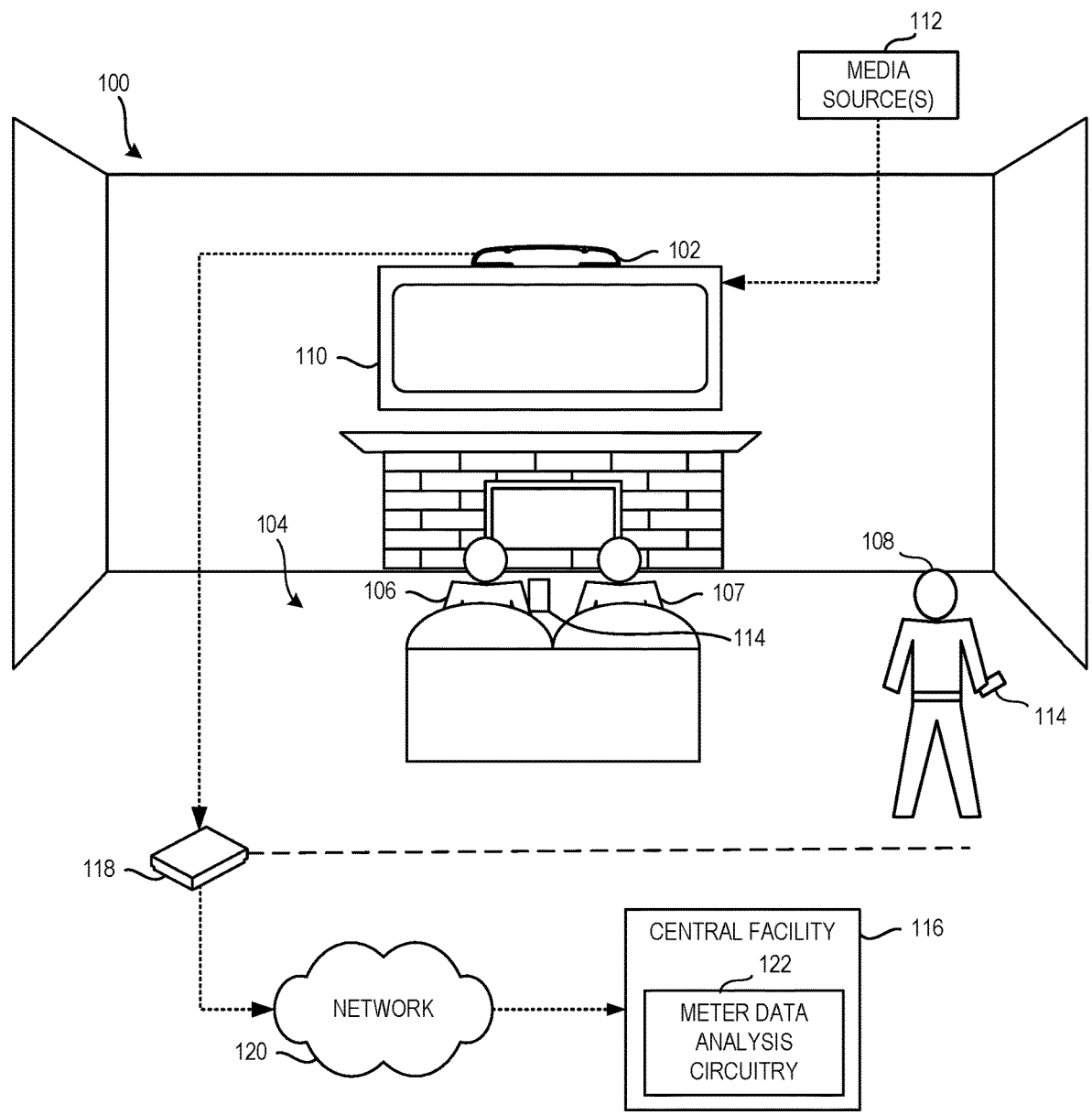
FIG. 1 illustrates an example audience measurement system having example meters to monitor an example media presentation environment and generate exposure data and engagement data for the media.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Media monitoring entities, such as The Nielsen Company (US), LLC, desire knowledge regarding how users interact with media devices such as smartphones, tablets, laptops, smart televisions, etc. In particular, media monitoring entities want to monitor media presentations made at the media devices to, among other things, monitor exposure to advertisements, determine advertisement effectiveness, determine user behavior, identify purchasing behavior associated with various demographics, etc. Media monitoring entities can provide media meters to people (e.g., panelists) which can generate media monitoring data based on the media exposure of those users. In some examples, such media meters can be associated with a specific media device (e.g., a television, a mobile phone, a computer, etc.) and/or a specific person (e.g., a portable meter, etc.).

Various monitoring techniques for monitoring user interactions with media are suitable. For example, television viewing or radio listening habits, including exposure to commercials therein, are monitored utilizing a variety of techniques. In some example techniques, acoustic energy to which an individual is exposed is monitored to produce data which identifies or characterizes a program, song, station, channel, commercial, etc., that is being watched or listened to by the individual. In some example techniques, a signature is extracted from transduced media data for identification by matching with reference signatures of known media data.

In the past, media audience measurements focused on measuring the exposure of a person to media content (e.g., a TV show, an advertisement, a song, etc.). As used herein, the term "media content" includes any type of content and/or advertisement delivered via any type of distribution medium. Thus, media includes television programming or advertisements, radio programming or advertisements, movies, web sites, streaming media, etc. More recently, media monitoring entities are interested in measuring the "attentiveness/engagement" of a person to the media content. In examples disclosed herein, an "attentiveness/engagement" metric is representative of the effectiveness of the media being played, which can augment measurement of whether the person was present/exposed to the media. For example, the attentiveness/engagement metric may be a score representative of a probability or likelihood that a measured media exposure was effective in capturing the attention of a person. However, measuring the attentiveness, engagement, and/or reaction of a person to media content can be more challenging than determining exposure, especially without a camera in the environment (e.g., room) in which the media is presented.

Examples disclosed herein trace and correlate the panelist's engagement with the acoustic audio around them to determine the attentiveness of the panelist during media content exposure. For example, room acoustic audio can be a good indicator to what is happening in the environment (e.g., the home), and can be used as an input to derive a measurement of the attention of the panelist. For example, appropriate acoustic processing algorithms can identify and classify activities such as laughing, eating, drinking, snoring, vacuum cleaning, walking (footsteps), etc. based on the collected audio data. Systems and methods for classifying the environmental ambient audio surrounding a portable device are known. For example, systems for classifying environmental ambient audio are disclosed in Jain et al., U.S. Pat. No. 9,332,363, which is hereby incorporated by reference in its entirety.

Examples disclosed herein use metrics collected by a portable device to trace and correlate the panelist's engagement with the acoustic audio in the environment. For example, the portable device can be a portable/wearable meter (e.g., the portable people meter (PPM) of The Nielsen Company (US), LLC), a media meter in a media device (e.g., a TV), a smartphone, a smart speaker, etc. In examples disclosed, the portable device includes a microphone to collect the acoustic audio data from environment, which can be a good indicator to activities happening in the environment/home. Example disclosed herein use the ambient audio from the acoustic audio data (e.g., the background sounds) to classify the audio and identify activities happening in the environment during media exposure. For example, example disclosed herein can use algorithms that can identify and classify activities such as laughing, eating, drinking, snoring, vacuum cleaning, walking (footsteps), etc.

Examples disclosed herein use classifications of ambient audio data to calculate an engagement metric for panelist(s) that identifies the likelihood the panelist(s) was (were) engaged/paying attention to the media they were exposed to. Example disclosed herein input the ambient audio data into a heuristic engine to determine the engagement metric for the panelist(s). For example, a machine learning engine can be used to determine classifications for the audio data and predict engagement metrics for the panelist(s). In examples disclosed herein, the heuristic engine may be included in a media meter, a PPM, a wearable meter, a smartphone, a smart speaker, a processor operating in a cloud environment, etc. The heuristic engine determines the engagement metric based on contextual data and the classification of the ambient audio data. For example, ambient audio classified as "laughter" during comedy media can result in an engagement metric indicating high likelihood the panelist is engaged/paying attention to the media content. In some examples, the heuristic engine may identify and classify the ambient audio as the panelist talking about the media content, which results in an engagement metric indicating high likelihood the panelist is engaged/paying attention to the media content.

In examples disclosed herein, the heuristic engine applies different weighting factors for different classifications to calculate the engagement metric. For example, a classification of "laughter" has a different weight than a classification of "vacuum cleaning" during media exposure. In examples disclosed herein, the heuristic engine outputs an engagement metric (e.g., a score) that identifies a measure of a probability of attentiveness for the panelist during exposure to media content. For example, the engagement metric can be a probability score that ranges from 0 to N (where N is a number, percentage, etc., such as 1 for a probability, 100% for a percentage, etc.). Examples disclosed herein compare the output engagement metric to one or more thresholds to determine if the panelist is engaged with the media content during a period of time. For example, when the engagement metric meets or exceeds a threshold, examples disclosed herein determine the panelist was engaged/paying attention to the media content during the time period of the collected ambient audio data.

Examples disclosed herein can determine engagement/attentiveness of people during exposure to media content in different environments. For example, examples disclosed herein can determine an engagement metric for a person exposed to media content in the home, and examples disclosed herein can determine an engagement metric for a live environment (e.g., an engagement for an audience during a live media presentation, a sporting event, a concert, etc.).

FIG. 1 is an illustration of an example audience measurement system 100 having example meters to monitor an example media presentation environment 104 and generate exposure data and engagement data for the media. In the illustrated example of FIG. 1, the media presentation environment 104 includes an example media device meter 102, panelists 106, 107, and 108, an example media device 110 that receives media from an example media source 112, and example meter(s) 114. The example media device meter 102 identifies the media presented by the media device 110 and reports media monitoring information to an example central facility 116 of an audience measurement entity via an example gateway 118 and an example network 120. The example media device meter 102 of FIG. 1 sends media monitoring data to the central facility 116 periodically, a-periodically and/or upon request by the central facility 116.

In the illustrated example of FIG. 1, the media presentation environment 104 is a room of a household (e.g., a room in a home of a panelist, such as the home of a "Nielsen family") that has been statistically selected to develop media (e.g., television) ratings data for a population/demographic of interest. People become panelists via, for example, a user interface presented on a media device (e.g., via the media device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example, one or more panelists 106, 107, and 108 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 104 is a household, the example media presentation environment 104 can additionally or alternatively be any other type(s) of environments such as, for example, a theater, a restaurant, a tavern, a retail location, an arena, etc.

In the illustrated example of FIG. 1, the example media device 110 is a television. However, the example media device 110 can correspond to any type of audio, video, and/or multimedia presentation device capable of presenting media audibly and/or visually. In some examples, the media device 110 (e.g., a television) may communicate audio to another media presentation device (e.g., an audio/video receiver) for output by one or more speakers (e.g., surround sound speakers, a sound bar, etc.). As another example, the media device 110 can correspond to a multimedia computer system, a personal digital assistant, a cellular/mobile smartphone, a radio, a home theater system, stored audio and/or video played back from a memory such as a digital video recorder or a digital versatile disc, a webpage, and/or any other communication device capable of presenting media to an audience (e.g., the panelists 106, 107, and 108).

The media source 112 may be any type of media provider(s), such as, but not limited to, a cable media service provider, a radio frequency (RF) media provider, an Internet based provider (e.g., IPTV), a satellite media service provider, etc. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc.

The example media device 110 of the illustrated example shown in FIG. 1 is a device that receives media from the media source 112 for presentation. In some examples, the media device 110 is capable of directly presenting media (e.g., via a display) while, in other examples, the media device 110 presents the media on separate media presentation equipment (e.g., speakers, a display, etc.). Thus, as used herein, "media devices" may or may not be able to present media without assistance from a second device. Media devices are typically consumer electronics. For example, the media device 110 of the illustrated example could be a personal computer such as a laptop computer, and, thus, capable of directly presenting media (e.g., via an integrated and/or connected display and speakers). In some examples, the media device 110 can correspond to a television and/or display device that supports the National Television Standards Committee (NTSC) standard, the Phase Alternating Line (PAL) standard, the Systéme Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media. While a television is shown in the illustrated example, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

In the illustrated example, the media device meter 102 can be physically coupled to the media device 110 or may be configured to capture signals emitted externally by the media device 110 (e.g., free field audio) such that direct physical coupling to the media device 110 is not required. For example, the media device meter 102 of the illustrated example may employ non-invasive monitoring not involving any physical connection to the media device 110 (e.g., via Bluetooth® connection, WIFI® connection, acoustic watermarking, etc.) and/or invasive monitoring involving one or more physical connections to the media device 110 (e.g., via a USB connection, a High Definition Media Interface (HDMI) connection, an Ethernet cable connection, etc.).

The example media device meter 102 detects exposure to media and electronically stores monitoring information (e.g., a code/watermark detected with the presented media, a signature of the presented media, an identifier of a panelist present at the time of the presentation, a timestamp of the time of the presentation) of the presented media. The stored monitoring information is then transmitted back to the central facility 116 via the gateway 118 and the network 120. In some examples, the stored monitoring information is transmitted to example meter data analysis circuitry 122 included in the central facility 116 for processing the monitoring information.

In examples disclosed herein, to monitor media presented by the media device 110, the media device meter 102 of the illustrated example employs audio watermarking techniques and/or signature based-metering techniques. Audio watermarking is a technique used to identify media, such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component of the media. In some examples, the audio or video component is selected to have a signal characteristic sufficient to hide the watermark. As used herein, the terms "code" and "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

For example, the media device meter 102 of the illustrated example senses audio (e.g., acoustic signals or ambient audio) output (e.g., emitted) by the media device 110. For example, the media device meter 102 processes the signals obtained from the media device 110 to detect media and/or source identifying signals (e.g., audio watermarks) embedded in portion(s) (e.g., audio portions) of the media presented by the media device 110. To sense ambient audio output by the media device 110, the media device meter 102 of the illustrated example includes an audio sensor (e.g., a microphone). In some examples, the media device meter 102 may process audio signals obtained from the media device 110 via a direct cable connection to detect media and/or source identifying audio watermarks embedded in such audio signals. In some examples, the media device meter 102 may process audio signals to generate respective audio signatures from the media presented by the media device 110.

To generate exposure data for the media, identification(s) of media to which the audience is exposed are correlated with people data (e.g., presence information) collected by the media device meter 102. The media device meter 102 of the illustrated example collects inputs (e.g., audience monitoring data) representative of the identities of the audience member(s) (e.g., the panelists 106, 107, and 108). In some examples, the media device meter 102 collects audience monitoring data by periodically or a-periodically prompting audience members in the monitored media presentation environment 104 to identify themselves as present in the audience (e.g., audience identification information). In some examples, the media device meter 102 responds to events (e.g., when the media device 110 is turned on, a channel is changed, an infrared control signal is detected, etc.) by prompting the audience member(s) to self-identify.

In some examples, the media device meter 102 is positioned in a location such that the audio sensor (e.g., microphone) receives ambient audio produced by the television and/or other devices of the media presentation environment 104 with sufficient quality to identify media presented by the media device 110 and/or other devices of the media presentation environment 104 (e.g., a surround sound speaker system). For example, in examples disclosed herein, the media device meter 102 may be placed on top of the television, secured to the bottom of the television, etc.

In the illustrated example of FIG. 1, the example meter(s) 114 detects ambient audio data in the media presentation environment 104. In some examples, the meter(s) 114 is a portable people meter (PPM) of The Nielsen Company (US), LLC, a wearable meter, a smartphone, etc. In some examples, the meter(s) 114 are associated with panelist(s) (e.g., the panelists 106, 107, and 108). The example meter(s) 114 includes an audio sensor (e.g., a microphone) to collect ambient audio data from the media presentation environment 104. In some examples, the meter(s) 114 collects ambient audio produced by the media device 110 (e.g., the television) from the media device meter 102 via the gateway 118. In some examples, the meter(s) 114 determines engagement information for the associated panelist(s) (e.g., the panelists 106, 107, and 108) based on the ambient audio data collected by the meter(s) 114 and the media device meter 102. An example implementation of the meter(s) 114 is described below in conjunction with FIG. 2.

The example gateway 118 of the illustrated example of FIG. 1 is a router that enables the media device meter 102, the meter 114, and/or other devices in the media presentation environment (e.g., the media device 110) to communicate with the network 120 (e.g., the Internet). In some examples, the example gateway 118 facilitates delivery of media from the media source 112 to the media device 110 via the Internet. In some examples, the example gateway 118 includes gateway functionality, such as modem capabilities. In some other examples, the example gateway 118 is implemented in two or more devices (e.g., a router, a modem, a switch, a firewall, etc.). The gateway 118 of the illustrated example may communicate with the network 120 via Ethernet, a digital subscriber line (DSL), a telephone line, a coaxial cable, a USB connection, a Bluetooth connection, any wireless connection, etc.

In some examples, the example gateway 118 hosts a Local Area Network (LAN) for the media presentation environment 104. In the illustrated example, the LAN is a wireless local area network (WLAN), and allows the media device meter 102, the meter 114, the media device 110, etc. to transmit and/or receive data via the Internet. Alternatively, the gateway 118 may be coupled to such a LAN. In some such examples, the media device meter 102 may communicate with the meter 114, and the media device meter 102 and the meter 114 may communicate with the central facility 116 via cellular communication (e.g., the media device meter 102 and the meter 114 may employ a built-in cellular modem).

The network 120 of the illustrated example is a wide area network (WAN) such as the Internet. However, in some examples, local networks may additionally or alternatively be used. Moreover, the example network 120 may be implemented using any type of public or private network, such as, but not limited to, the Internet, a telephone network, a local area network (LAN), a cable network, and/or a wireless network, or any combination thereof.

The central facility 116 of the illustrated example is implemented by one or more servers. The central facility 116 processes and stores data received from the media device meter 102 and the meter 114. The central facility 116 is an execution environment used to implement the example meter data analysis circuitry 122. In some examples, the central facility 116 is associated with an audience measurement entity. In some examples, the central facility 116 can be a physical processing center (e.g., a central facility of the audience measurement entity, etc.). Additionally or alternatively, the central facility 116 can be implemented via a cloud service (e.g., AWS®, etc.). In this example, the central facility 116 can further store and process generated watermark and signature reference data.

The example meter data analysis circuitry 122 of the illustrated example of FIG. 1 determines media measurement data. For example, media measurement data is determined by monitoring media output by the media device 110 and/or other media presentation device(s) collected by the example media device meter 102. For example, the media device meter 102 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media device 110. To extract media identification data, the meter data analysis circuitry 122 extracts and/or processes the collected media identifying information and/or data received by the media device meter 102, which can be compared to reference data to perform source and/or content identification. Any other type(s) and/or number of media monitoring techniques can be supported by the meter data analysis circuitry 122.

The example meter data analysis circuitry 122 processes the collected media identifying information and/or data received by the media device meter 102 to detect, identify, credit, etc., respective media assets and/or portions thereof (e.g., media segments) associated with the corresponding data. For example, the meter data analysis circuitry 122 obtains monitored signatures and/or watermarks. The meter data analysis circuitry 122 determines signature matches between the monitored signatures and reference signatures. The meter data analysis circuitry 122 credits the media assets associated with the media identifying information of the monitored signatures. For example, the meter data analysis circuitry 122 can compare the media identifying information to generated reference data to determine what respective media is associated with the corresponding media identifying information. The meter data analysis circuitry 122 of the illustrated example also analyzes the media identifying information to determine if the media asset(s), and/or particular portion(s) (e.g., segment(s)) thereof, associated with the signature match and/or watermark match is (are) to be credited. For example, the meter data analysis circuitry 122 can compare monitored media signatures in the media identifying information to a library of generated reference signatures to determine the media asset(s) associated with the monitored media signatures. In some examples, the meter data analysis circuitry 122 also collects engagement information/data from the example meter 114 to associate with the media exposure data determined from the media device meter 102. The example meter data analysis circuitry 122 credits media exposure to an identified media asset and also includes the engagement information for that media exposure (e.g., was the panelist actually engaged/ paying attention to the media during the media exposure).

Figure 2:
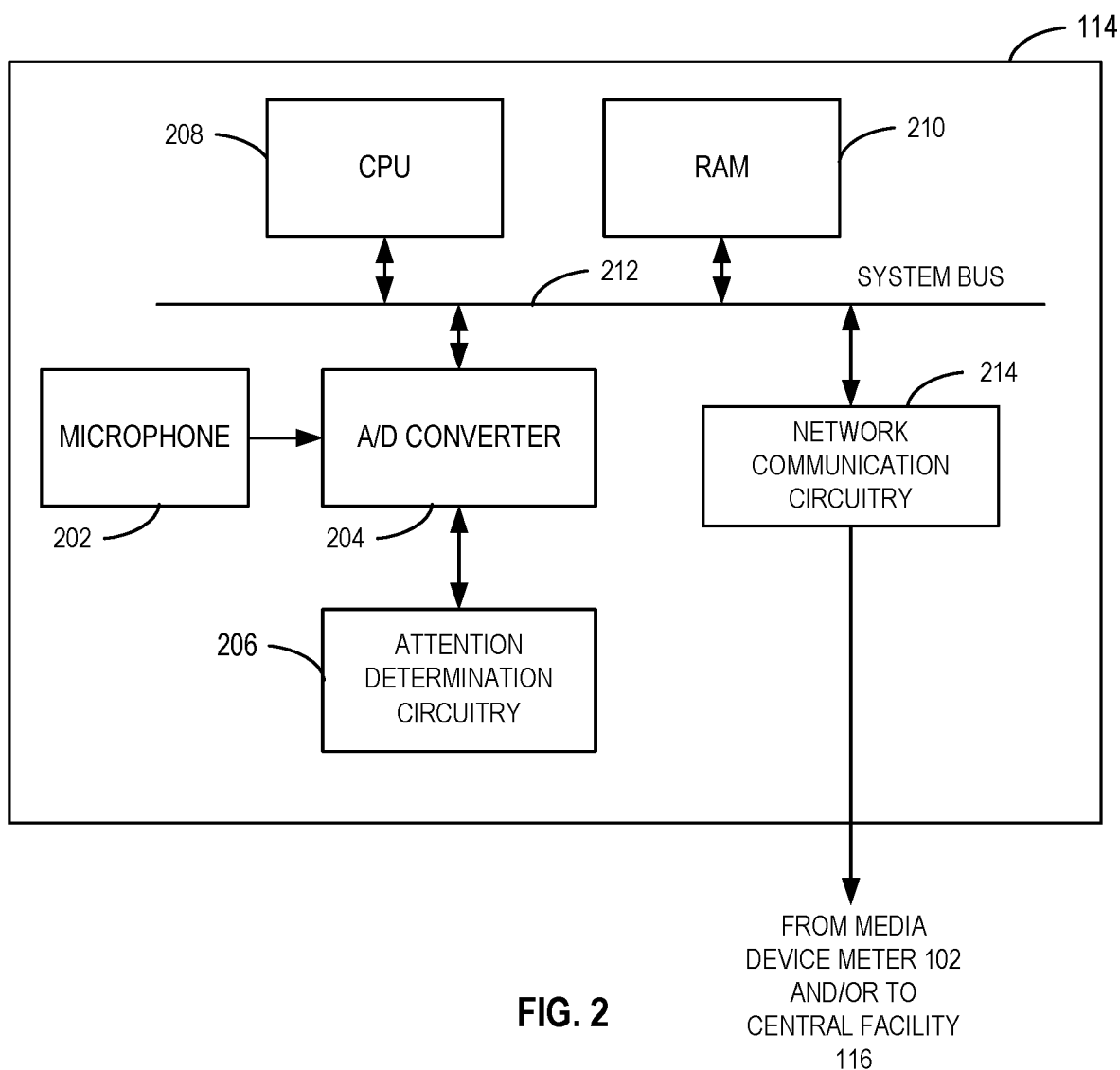
FIG. 2 illustrates a block diagram of the example meter of FIG. 1.

FIG. 2 is a block diagram of an example implementation of the meter 114 of FIG. 1. In the illustrated example, the meter 114 includes an example microphone 202, an example analog-to-digital (A/D) converter 204, example attention determination circuitry 206, an example CPU 208, example RAM 210, an example system bus 212, and example network communication circuitry 214. The example microphone 202 records samples of audio data of the media presentation environment 104 and provides the audio data to the meter 114. For example, the A/D converter 204 obtains the audio data recorded by the microphone 202. The example A/D converter 204 converts the audio data into digital audio data.

The example attention determination circuitry 206 determines engagement/attentiveness of people (e.g., the panelists 106, 107, 108 of FIG. 1) during exposure to media content in the media presentation environment 104. The example attention determination circuitry 206 determines classifications for the ambient audio data recorded by the microphone 202 to calculate an engagement metric for the panelist(s) (e.g., the panelists 106, 107, 108) that identifies the likelihood the panelist(s) were engaged/paying attention to the media they were exposed to in the media presentation environment 104. The example attention determination circuitry 206 uses one or more machine learning engines to determine the classifications and predict the engagement metric. An example implementation of the attention determination circuitry 206 is described below in conjunction with FIG. 3.

The example CPU 208 of the illustrated example is hardware. For example, the CPU 208 can be implemented by one or more integrated circuits, logic circuits, microprocessors, or controllers from any desired family or manufacturer. The hardware processor may be a semiconductor based (e.g., silicon based) device. In some examples, the CPU 208 implements the example A/D converter 204, the example attention determination circuitry 206, and the example network communication circuitry 214.

The CPU 208 of the illustrated example is in communication with a main memory including the RAM 210 via the system bus 212. The RAM 210 may be implemented by Synchronous Dynamic Random Access Memory (SDRAM), Dynamic Random Access Memory (DRAM), RAMBUS® Dynamic Random Access Memory (RDRAM®) and/or any other type of random access memory device. Additionally or alternatively, the RAM 210 may be implemented by flash memory and/or any other desired type of memory device. Access to the RAM 210 is controlled by a memory controller.

The example network communication circuitry 214 of the illustrated example of FIG. 2 is a communication interface configured to receive and/or otherwise transmit corresponding communications from the media device meter 102 and/or to the central facility 116 of FIG. 1. In the illustrated example, the network communication circuitry 214 facilitates wired communication via an Ethernet network hosted by the example gateway 118 of FIG. 1. In some examples, the network communication circuitry 214 is implemented by a Wi-Fi radio that communicates via the LAN hosted by the example gateway 118. In other examples disclosed herein, any other type of wireless transceiver may additionally or alternatively be used to implement the network communication circuitry 214. In examples disclosed herein, the network communication circuitry 214 may receive ambient audio data from the example media device meter 102. In such examples, the network communication circuitry 214 transmits the ambient audio data from the media device meter 102 to the attention determination circuitry 206 via the system bus 212. In other examples disclosed herein, the network communication circuitry 214 may transmit engagement metric information provided by the attention determination circuitry 206 to the central facility 116 of the media presentation environment 104.

While an example manner of implementing the example meter 114 of FIG. 1 is illustrated in FIG. 2, one or more of the elements, processes, and/or devices illustrated in FIG. 2 may be combined, divided, re-arranged, omitted, eliminated, and/or implemented in any other way. Further, the example microphone 202, the example A/D converter 204, the example attention determination circuitry 206, the example CPU 208, the example RAM 210, the example network communication circuitry 214 and/or, more generally, the example meter 114 of FIG. 1, may be implemented by hardware alone or by hardware in combination with software and/or firmware. Thus, for example, any of the example microphone 202, the example A/D converter 204, the example attention determination circuitry 206, the example CPU 208, the example RAM 210, the example network communication circuitry 214, and/or, more generally, the example meter 114, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example meter 114 of FIG. 1 may include one or more elements, processes, and/or devices in addition to, or instead of, those illustrated in FIG. 2, and/or may include more than one of any or all of the illustrated elements, processes and devices.

Figure 3:
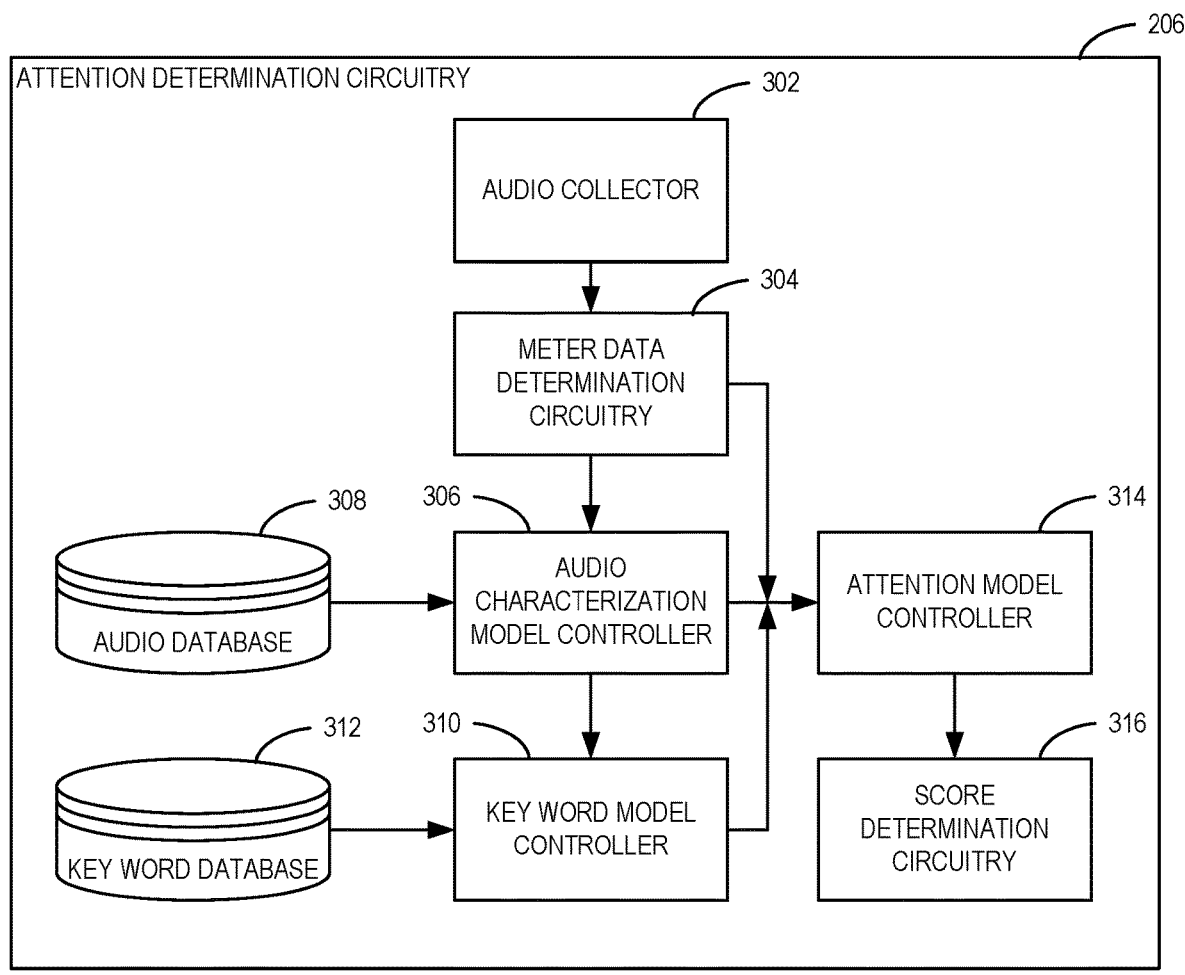
FIG. 3 illustrates a block diagram of the example attention determination circuitry of FIG. 2.

FIG. 3 illustrates a block diagram of an example implementation of the attention determination circuitry 206 of FIG. 2, which is to determine an engagement metric for the user associated with the example meter 114. The example attention determination circuitry 206 of FIG. 3 may be instantiated (e.g., creating an instance of, bring into being for any length of time, materialize, implement, etc.) by processor circuitry such as a central processing unit executing instructions. Additionally or alternatively, the example attention determination circuitry 206 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

The example attention determination circuitry 206 of FIG. 3 includes an example audio collector 302 to collect ambient audio data from the media presentation environment 104. The example audio collector 302 collects the ambient audio data sensed/collected by the example media device meter 102 of FIG. 1 and the ambient audio data collected by the example microphone 202 included in the example meter 114 of FIGS. 1 and 2. In examples disclosed herein, the example media device meter 102 is placed near the media device 110 (e.g., a television) to collect audio data from the media device 110, and the example meter 114 is placed away from the media device 110 (e.g., on the panelist) to collect audio data from the ambient environment (e.g., the media presentation environment 104). The example audio collector 302 collects both audio data from the media device meter 102 and audio data from the meter 114 to determine audio data from the media device 110 and audio data from the ambient environment. The example audio collector 302 identifies media device audio data from the ambient audio data. In some examples, the audio collector 302 determines the media device audio data from the audio data collected by the media device meter 102. For example, the media device meter 102 obtains the media device audio data in the audio data collected from the example media device 110. The example audio collector 302 also identifies the ambient environment audio data from the collected ambient audio data. In some examples, the audio collector 302 can apply one or more adaptive gain control and/or adaptive filtering techniques to the audio data from the media device meter 102 and the audio data from the meter 114. In some examples, the audio collector 302 compares the audio data from the media device meter 102 and the audio data from the meter 114 (e.g., after applying the adaptive gain control and/or adaptive filtering techniques) to determine the ambient environment audio data. For example, the audio collector 302 may subtract the audio data collected by the media device meter 102 (e.g., including the audio data from the media device 110) from the audio data collected by the meter 114 (e.g., including a sum of the audio data from the media device 110 and the ambient audio data from the media presentation environment 104) to isolate the ambient environment audio data. In such examples, the audio collector 302 subtracts the audio data from the media device 110 collected by the media device meter 102 from the combination (sum) of the audio data from the media device 110 and the ambient audio data from the media presentation environment 104 collected by the meter 114 to isolate the ambient environment audio data.

In some examples, the meter 114 and/or attention determination circuitry 206 includes means for identifying media device audio data and ambient environment audio data. For example, the means for identifying may be implemented by the example audio collector 302. In some examples, the audio collector 302 may be instantiated by processor circuitry such as the example processor circuitry 912 of FIG. 9. For instance, the audio collector 302 may be instantiated by the example general purpose processor circuitry 1000 of FIG. 10 executing machine executable instructions such as that implemented by at least block 502 of FIG. 5 and blocks 602, 604 of FIG. 6. In some examples, the audio collector 302 may be instantiated by hardware logic circuitry, which may be implemented by an ASIC or the FPGA circuitry 1100 of FIG. 11 structured to perform operations corresponding to the machine readable instructions. Additionally or alternatively, the audio collector 302 may be instantiated by any other combination of hardware, software, and/or firmware. For example, the audio collector 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 3, the example attention determination circuitry 206 includes example meter data determination circuitry 304 to determine meter data and audio data from the media device meter 102 and the meter 114. In some examples, the meter data determination circuitry 304 obtains meter data from the meter 114 and the media device meter 102. For example, the meter 114 may include a motion sensor (e.g., an accelerometer) to determine if the meter 114 is moving (e.g., the associated panelist is moving around during the media presentation in the media presentation environment 104). In some examples, the media device meter 102 may include a sensor to determine the audio volume from the media device 110 (e.g., was the audio volume turned up, was the audio volume turned down, was the audio volume muted, etc.). The example meter data determination circuitry 304 determines the meter data and audio data from the media meters (e.g., the media device meter 102 and the meter 114) for use in determining the engagement metric of the associated panelist(s). The example meter data determination circuitry 304 transmits the meter data and audio data from the media meters to the example attention model controller 314 as inputs to the attention machine learning model.

In some examples, the meter 114 and/or attention determination circuitry 206 includes means for obtaining meter data from a meter. For example, the means for obtaining may be implemented by the example meter data determination circuitry 304. In some examples, the meter data determination circuitry 304 may be instantiated by processor circuitry such as the example processor circuitry 912 of FIG. 9. For instance, the meter data determination circuitry 304 may be instantiated by the example general purpose processor circuitry 1000 of FIG. 10 executing machine executable instructions such as that implemented by at least block 606 of FIG. 6. In some examples, the meter data determination circuitry 304 may be instantiated by hardware logic circuitry, which may be implemented by an ASIC or the FPGA circuitry 1100 of FIG. 11 structured to perform operations corresponding to the machine readable instructions. Additionally or alternatively, the meter data determination circuitry 304 may be instantiated by any other combination of hardware, software, and/or firmware. For example, the meter data determination circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example attention determination circuitry 206 of FIG. 3 includes an example audio characterization model controller 306 to determine sound classification from the ambient environment audio data identified by the example audio collector 302. The example audio characterization model controller 306 uses an audio characterization machine learning model to determine the sound classification(s) of the ambient environment audio data. In some examples, the audio characterization model controller 306 processes the ambient environment audio data with the audio characterization machine learning model to determine one or more sound classifications. In examples disclosed herein, the one or more sound classifications include laughing, eating, drinking, snoring, vacuum cleaning, walking, etc. The example audio characterization model controller 306 obtains a library of sounds from an example audio database 308. The example audio database 308 includes a library of sounds and associated classifications (e.g., laughing, eating, drinking, snoring, vacuum cleaning, walking, etc.). The example audio characterization model controller 306 processes the ambient environment audio data using the audio characterization machine learning model to compare the ambient environment audio data to the library of sounds in the audio database 308 to determine matches between the ambient environment audio data and the library of sounds. In some examples, the audio characterization model controller 306 identifies the sounds classifications of the matches between the ambient environment audio data and the library of sounds based on the associated classifications in the audio database 308.

In some examples, the meter 114 and/or attention determination circuitry 206 includes means for processing ambient environment audio data. For example, the means for processing may be implemented by the example audio characterization model controller 306. In some examples, the audio characterization model controller 306 may be instantiated by processor circuitry such as the example processor circuitry 912 of FIG. 9. For instance, the audio characterization model controller 306 may be instantiated by the example general purpose processor circuitry 1000 of FIG. 10 executing machine executable instructions such as that implemented by at least block 608 of FIG. 6. In some examples, the audio characterization model controller 306 may be instantiated by hardware logic circuitry, which may be implemented by an ASIC or the FPGA circuitry 1100 of FIG. 11 structured to perform operations corresponding to the machine readable instructions. Additionally or alternatively, the audio characterization model controller 306 may be instantiated by any other combination of hardware, software, and/or firmware. For example, the audio characterization model controller 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example attention determination circuitry 206 of FIG. 3 includes an example key word model controller 310 to determine key word classifications from the ambient environment audio data and to determine contextual classifications from the media device audio data. The example key word model controller 310 processes the ambient environment audio data and the media device audio data identified by the example audio collector 302 using a key word machine learning model. The example key word model controller 310 processes the ambient environment audio data using the key word machine learning model to determine key word classifications from the ambient environment (e.g., the media presentation environment 104 of FIG. 1). The example key word model controller 310 obtains a library of key words from an example key word database 312. The example key word database 312 includes a library of key words and associated classifications. For example, the key word database 312 can include key words associated with actions for the media device (e.g., "turn it down," "pause," "turn it off," etc.), key words associated reactions (e.g., "that was funny," "that is sad," etc.). The example key word model controller 310 processes the ambient environment audio data using the key word machine learning model to compare the ambient environment audio data to the library of key words in the key word database 312 to determines matches between the ambient environment audio data and the library of key words. In some examples, the key word model controller 310 identifies key word classifications of the matches between the ambient environment audio data and the library of key words based on the associated classifications in the key word database 312.

The example key word model controller 310 processes the media device audio data to determine contextual classifications from the media presented on the media device (e.g., the media device 110 of FIG. 1). In some examples, the key word model controller 310 identifies key words in the media device audio data using the library of key words in the example key word database 312. The key word model controller 310 processes the media device audio data using the key word machine learning model to determine contextual classifications from the key words identified in the media device audio data. For example, the key word model controller 310 may determine contextual classifications related to the genre of the media (e.g., comedy, honor, romance, etc.), actions in a scene of the media (e.g., a fight scene, two characters having a conversation, etc.), etc. In some examples, the key word model controller 310 determines the contextual classifications using the key word machine learning model for comparison to the determined key word classifications of the ambient environment audio data.

In some examples, the meter 114 and/or attention determination circuitry 206 includes means for processing ambient environment audio data and media device audio data. For example, the means for processing may be implemented by the example key word model controller 310. In some examples, the key word model controller 310 may be instantiated by processor circuitry such as the example processor circuitry 912 of FIG. 9. For instance, key word model controller 310 may be instantiated by the example general purpose processor circuitry 1000 of FIG. 10 executing machine executable instructions such as that implemented by at least blocks 610, 612 of FIG. 6. In some examples, the key word model controller 310 may be instantiated by hardware logic circuitry, which may be implemented by an ASIC or the FPGA circuitry 1100 of FIG. 11 structured to perform operations corresponding to the machine readable instructions. Additionally or alternatively, the key word model controller 310 may be instantiated by any other combination of hardware, software, and/or firmware. For example, the key word model controller 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In examples disclosed herein, the meter data determination circuitry 304, the audio characterization model controller 306, and the key word model controller 310 process the ambient environment audio data and the meter device audio data concurrently/simultaneously. The example meter data determination circuitry 304, the example audio characterization model controller 306, and the example key word model controller 310 transmit the respective classification data to the example attention model controller 314 for processing to determine an engagement metric.

The example attention determination circuitry 206 of FIG. 3 includes an example attention model controller 314 to determine weights for the different classification data. The example attention model controller 314 collects the determined meter data and audio data from the meter data determination circuitry 304, the determined sound classifications from the audio characterization model controller 306, and the determined key word classifications and contextual classifications from the key word model controller 310. The example attention model controller 314 applies weights to the determined classification data (e.g., the meter data and audio data, the sound classifications, the key word classifications, and the contextual classifications). In some examples, the attention model controller 314 applies different weighting factors to the different classifications for calculating the engagement metric. For example, different sounds classifications may have different associated weights (e.g., a sound classification of "laughter" may have a different weight than a sound classification of "vacuum cleaning" during media exposure). In other examples, the combination of different classifications may have different associated weights. For example, a sound classification of "laughter" during a media exposure with a contextual classification of "comedy" may have a higher weighting factor to indicate a high likelihood the panelist is engaged during the media exposure. In another example, a key word classification of a panelist talking with key word related to the contextual classification of the media content may have a higher weighting factor to indicate a high likelihood the panelist is engaged during the media exposure. The example attention model controller 314 combines the determined classification data (e.g., the meter data and audio data, the sound classifications, the key word classifications, and the contextual classifications) to apply different weighting factors to the classification data for determining the engagement metric. The example attention model controller 314 also generates an attention machine learning model for processing the classification data. An example implementation of the attention model controller 314 generating the attention machine learning model is described below in conjunction with FIG. 4.

In some examples, the meter 114 and/or attention determination circuitry 206 includes means for applying weights to classification data. For example, the means for applying may be implemented by the example attention model controller 314. In some examples, the attention model controller 314 may be instantiated by processor circuitry such as the example processor circuitry 912 of FIG. 9. For instance, the attention model controller 314 may be instantiated by the example general purpose processor circuitry 1000 of FIG. 10 executing machine executable instructions such as that implemented by at least blocks 702, 704, 706, 708, 710 of FIG. 7. In some examples, the attention model controller 314 may be instantiated by hardware logic circuitry, which may be implemented by an ASIC or the FPGA circuitry 1100 of FIG. 11 structured to perform operations corresponding to the machine readable instructions. Additionally or alternatively, the attention model controller 314 may be instantiated by any other combination of hardware, software, and/or firmware. For example, the attention model controller 314 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 3, the example attention determination circuitry 206 includes example score determination circuitry 316 to calculate the engagement metric for panelist(s) that identifies the likelihood the panelist(s) were engaged/paying attention to the media exposure. The example score determination circuitry 316 processes the weighted classification data with the attention machine learning model generated by the example attention model controller 314 to calculate the engagement metric. The example score determination circuitry 316 calculates the engagement metric based on the classification data (e.g., the meter data and audio data, the sound classifications, the key word classifications, and the contextual classifications) weighted by the example attention model controller 314. In examples disclosed herein, the engagement metric (e.g., a score) is a measure of a probability of attentiveness for the associated panelist(s) during exposure to media content. For example, the engagement metric can be a probability score that ranges from 0 to N (where N is a number, percentage, etc., such as 1 for a probability, 100% for a percentage, etc.). In some examples, the engagement metric can be a binary score (e.g., 0 or 1, engaged or not engaged, etc.). The example engagement metric is output from the attention machine learning model after the score determination circuitry 316 processes the weighted classification data.

The example score determination circuitry 316 determines whether the at least one individual (panelist) associated with the meter 114 is engaged with media presented on a media device (e.g., the media device 110) based on the engagement metric. In some examples, the engagement metric is binary (e.g., 0 or 1, engaged or not engaged, etc.). In such examples, the score determination circuitry 316 determines whether the at least one individual (panelist) is engaged based on the binary state of the engagement metric. In other examples, the engagement metric is a probability score that ranges from 0 to N. In such examples, the score determination circuitry 316 determines if the engagement metric satisfies a threshold. In some examples, the threshold is a number, percentage, etc., such as 0.7 for a probability, 70% for a percentage, etc. The example score determination circuitry 316 determines the individual/user/panelist is engaged with the media when the engagement metric satisfies (e.g., is greater than or equal to) the threshold. In some examples, the score determination circuitry 316 transmits the engagement information to the example central facility 116 of FIG. 1 via the example network communication circuitry 214 of FIG. 2.

In some examples, the meter 114 and/or attention determination circuitry 206 includes means for determining an engagement metric. For example, the means for determining may be implemented by the example score determination circuitry 316. In some examples, the score determination circuitry 316 may be instantiated by processor circuitry such as the example processor circuitry 912 of FIG. 9. For instance, the score determination circuitry 316 may be instantiated by the example general purpose processor circuitry 1000 of FIG. 10 executing machine executable instructions such as that implemented by at least blocks 506, 508, 510, 512, 514 of FIG. 5 and block 712 of FIG. 7. In some examples, the score determination circuitry 316 may be instantiated by hardware logic circuitry, which may be implemented by an ASIC or the FPGA circuitry 1100 of FIG. 11 structured to perform operations corresponding to the machine readable instructions. Additionally or alternatively, the score determination circuitry 316 may be instantiated by any other combination of hardware, software, and/or firmware. For example, the score determination circuitry 316 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 4:
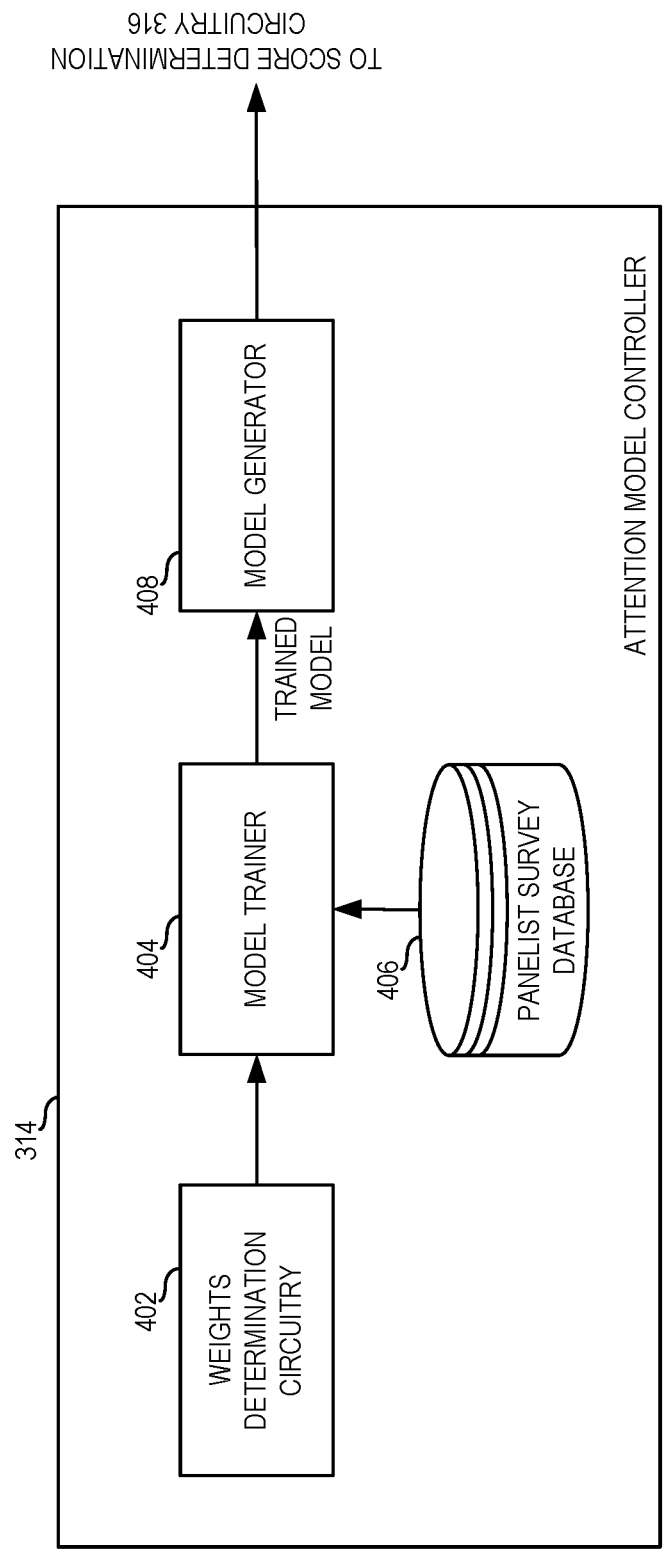
FIG. 4 illustrates a block diagram of the example attention model controller of FIG. 3.

FIG. 4 illustrates a block diagram of an example implementation of the attention model controller 314 of FIG. 3, which is to generate an attention machine learning model. The example attention model controller 314 of FIG. 4 may be instantiated (e.g., creating an instance of, bring into being for any length of time, materialize, implement, etc.) by processor circuitry such as a central processing unit executing instructions. Additionally or alternatively, the example attention model controller 314 of FIG. 4 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by one or more virtual machines and/or containers executing on the microprocessor.

In the illustrated example of FIG. 4, the example attention model controller 314 includes example weights determination circuitry 402 to determine weights for the classification data. The example weights determination circuitry 402 determines different weights based on classification data (e.g., the meter data and audio data, the sound classifications, the key word classifications, and the contextual classifications) collected by the example attention model controller 314 over time. In some examples, the weights determination circuitry 402 determines weighting factors for each of the different classifications data (e.g., the meter data and audio data, the sound classifications, the key word classifications, and the contextual classifications) based on the historical classification data collected by the attention model controller 314.

In some examples, the meter 114 and/or the attention model controller 314 includes means for determining weights for the classification data. For example, the means for determining may be implemented by the example weights determination circuitry 402. In some examples, the weights determination circuitry 402 may be instantiated by processor circuitry such as the example processor circuitry 912 of FIG. 9. For instance, the weights determination circuitry 402 may be instantiated by the example general purpose processor circuitry 1000 of FIG. 10 executing machine executable instructions such as that implemented by at least block 804 of FIG. 8. In some examples, the weights determination circuitry 402 may be instantiated by hardware logic circuitry, which may be implemented by an ASIC or the FPGA circuitry 1100 of FIG. 11 structured to perform operations corresponding to the machine readable instructions. Additionally or alternatively, the weights determination circuitry 402 may be instantiated by any other combination of hardware, software, and/or firmware. For example, the weights determination circuitry 402 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example attention model controller 314 of FIG. 4 includes an example model trainer 404 to train the attention machine learning model based on the weights determined by the example weights determination circuitry 402, the ambient audio data collected by the audio collector 302 of FIG. 3, and the panelist survey data stored in an example panelist survey database 406. The model trainer 404 operates in a training mode where it receives multiple instances of weights and ambient audio data, generates a prediction, and outputs an attention machine learning model based on that prediction. For the example model trainer 404 to generate an attention machine learning model, the model trainer 404 receives weights corresponding to actual representations of classification data (e.g., the meter data and audio data, the sound classifications, the key word classifications, and the contextual classifications) of ambient audio data from the media presentation environment 104. The example model trainer also collects ambient audio data collected from the media presentation environment 104 (e.g., via the audio collector 302 of FIG. 3). The example model trainer 404 collects reported panelist survey data from the example panelist survey database 406 associated with the timestamps (e.g., day and time) of the collected ambient audio data. In some examples, the panelist survey data includes panelist answers as to whether they were paying attention to the media presentation at a specific day and time. The example model trainer 404 uses the panelist survey data as a source of truth to train the attention machine learning models by comparing the panelist survey data to the ambient audio data collected at the same timestamps.

The example model trainer 404 trains the attention machine learning model with a combination of (i) sensed ambient audio data collected by a media device meter (e.g., the media device meter 102 and the meter 114 of FIG. 1) and (ii) panelist survey data that is time aligned with the sensed ambient audio data. For example, during a training mode, verifications are made about the engagement information for panelist(s) in the media presentation environment 104 (e.g., answers included in the panelist survey data) so that the engagement data provided is suitable for learning. For example, the model trainer 404 receives weights indicative of the weights to apply to actual ambient audio data from the media presentation environment 104 and identifies a pattern in the weights that maps the ambient audio data of the actual media presentation environment 104 to the engagement information from the panelist(s) in the panelist survey data and outputs a model that captures these daily and/or weekly patterns. The example model trainer 404 provides the output attention machine learning model to the example model generator 408 to assist in generating predictions about the engagement information of the panelist(s) at subsequent dates and times.

In some examples, the meter 114 and/or the attention model controller 314 includes means for training the attention machine learning model. For example, the means for training may be implemented by the example model trainer 404. In some examples, the model trainer 404 may be instantiated by processor circuitry such as the example processor circuitry 912 of FIG. 9. For instance, the model trainer 404 may be instantiated by the example general purpose processor circuitry 1000 of FIG. 10 executing machine executable instructions such as that implemented by at least blocks 802, 806, 808 of FIG. 8. In some examples, the model trainer 404 may be instantiated by hardware logic circuitry, which may be implemented by an ASIC or the FPGA circuitry 1100 of FIG. 11 structured to perform operations corresponding to the machine readable instructions. Additionally or alternatively, the model trainer 404 may be instantiated by any other combination of hardware, software, and/or firmware. For example, the model trainer 404 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example attention model controller 314 of FIG. 4 includes an example model generator 408 to generate the trained attention machine learning model from the example model trainer 404. For example, the model generator 408 may receive a notification from the model trainer 404 that a new and/or updated attention machine learning model has been trained and the model generator 408 may create a file in which the attention machine learning model is published so that the attention machine learning model can be saved and/or stored as the file. In some examples, the model generator 408 provides a notification to the score determination circuitry 316 of FIG. 3 that an attention machine learning model is ready to be used for processing the classification data. In some examples, the model generator 408 determines whether to perform additional training on the attention machine learning model. In some examples, the weight determination circuitry 402 updates the determined weights/weighting factors over time as more ambient audio data and panelist survey data are collected, and the model trainer 404 updates the attention machine learning model.

In some examples, the meter 114 and/or the attention model controller 314 includes means generating a trained machine learning model. For example, the means for generating may be implemented by the example model generator 408. In some examples, the model generator 408 may be instantiated by processor circuitry such as the example processor circuitry 912 of FIG. 9. For instance, the model generator 408 may be instantiated by the example general purpose processor circuitry 1000 of FIG. 10 executing machine executable instructions such as that implemented by at least blocks 810, 812 of FIG. 8. In some examples, the model generator 408 may be instantiated by hardware logic circuitry, which may be implemented by an ASIC or the FPGA circuitry 1100 of FIG. 11 structured to perform operations corresponding to the machine readable instructions. Additionally or alternatively, the model generator 408 may be instantiated by any other combination of hardware, software, and/or firmware. For example, the model generator 408 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the example attention determination circuitry of FIG. 2 is illustrated in FIG. 3, one or more of the elements, processes, and/or devices illustrated in FIG. 3 may be combined, divided, re-arranged, omitted, eliminated, and/or implemented in any other way. Further, the example audio collector 302, the example meter data determination circuitry 304, the example audio characterization model controller 306, the example key word model controller 310, the example attention model controller 314, the example score determination circuitry 316, the example weights determination circuitry 402, the example model trainer 404, and the example model generator 408 and/or, more generally, the example attention determination circuitry 206 of FIG. 2, may be implemented by hardware alone or by hardware in combination with software and/or firmware. Thus, for example, any of the example audio collector 302, the example meter data determination circuitry 304, the example audio characterization model controller 306, the example key word model controller 310, the example attention model controller 314, the example score determination circuitry 316, the example weights determination circuitry 402, the example model trainer 404, and the example model generator 408, and/or, more generally, the example attention determination circuitry 206, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example attention determination circuitry 206 of FIG. 2 may include one or more elements, processes, and/or devices in addition to, or instead of, those illustrated in FIG. 3, and/or may include more than one of any or all of the illustrated elements, processes and devices.

Flowcharts representative of example hardware logic circuitry, machine readable instructions, hardware implemented state machines, and/or any combination thereof for implementing the example attention determination circuitry 206 are shown in FIGS. 5-8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5-8, many other methods of implementing the example attention determination circuitry 206 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 5-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 5:
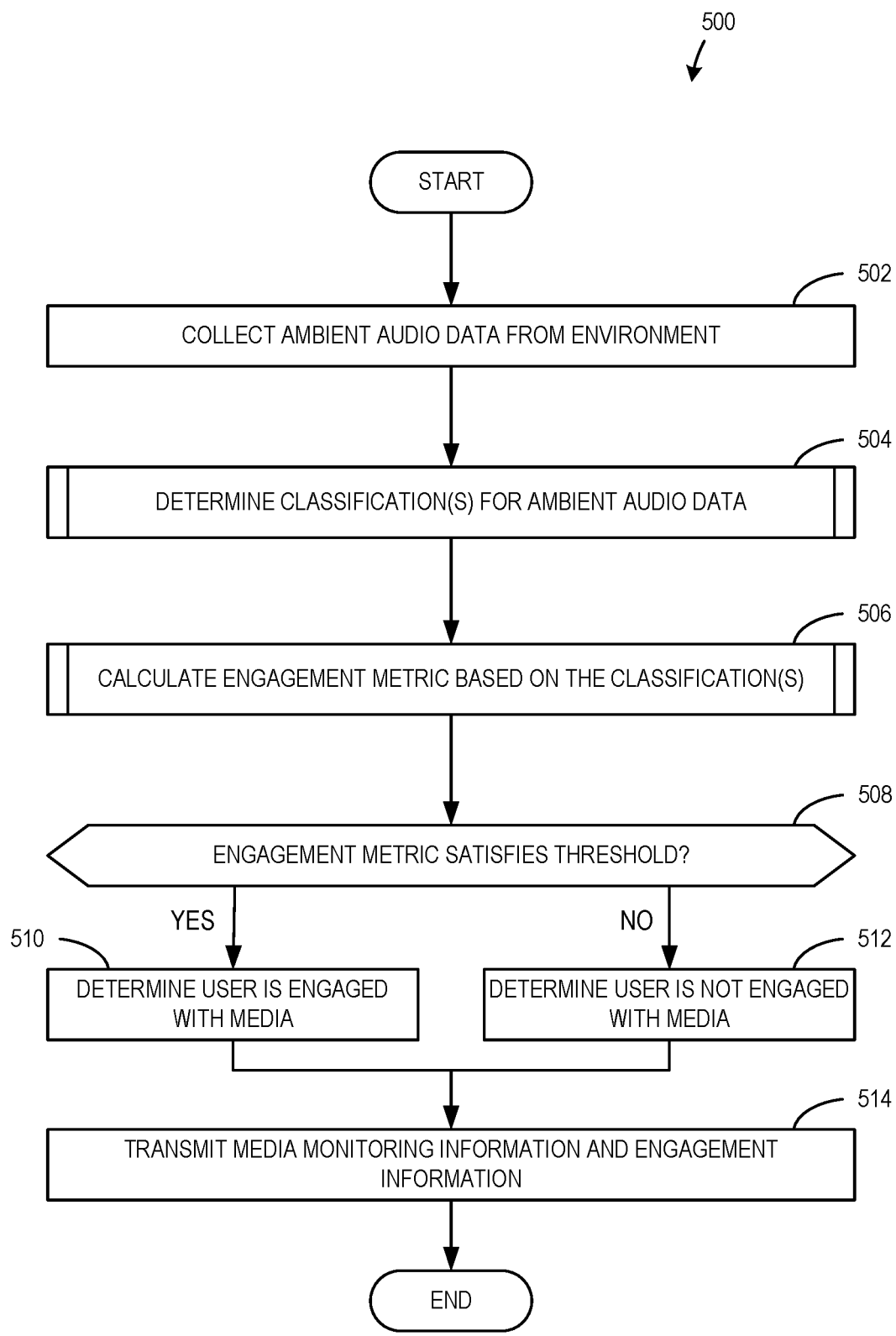
FIG. 5 is a flowchart representative of example machine readable instructions and/or example operations that may be executed by example processor circuitry to implement the example attention determination circuitry of FIG. 3.

FIG. 5 is a flowchart representative of example machine readable instructions and/or example operations 500 that may be executed and/or instantiated by processor circuitry to implement the example attention determination circuitry 206 of FIG. 3. The machine readable instructions and/or the operations 500 of FIG. 5 begin at block 502, at which the example audio collector 302 collects ambient audio data from the environment. The example audio collector 302 collects the ambient audio data sensed/collected by the example media device meter 102 of FIG. 1 and the ambient audio data collected by the example microphone 202 included in the example meter 114 of FIGS. 1 and 2. In examples disclosed herein, the example media device meter 102 is placed near the media device 110 (e.g., a television) to collect audio data from the media device 110, and the example meter 114 is placed away from the media device 110 (e.g., on the panelist) to collect audio data from the ambient environment (e.g., the media presentation environment 104). The example audio collector 302 collects both audio data from the media device meter 102 and the meter 114 to determine audio data from the media device 110 and audio data from the ambient environment.

Figure 6:
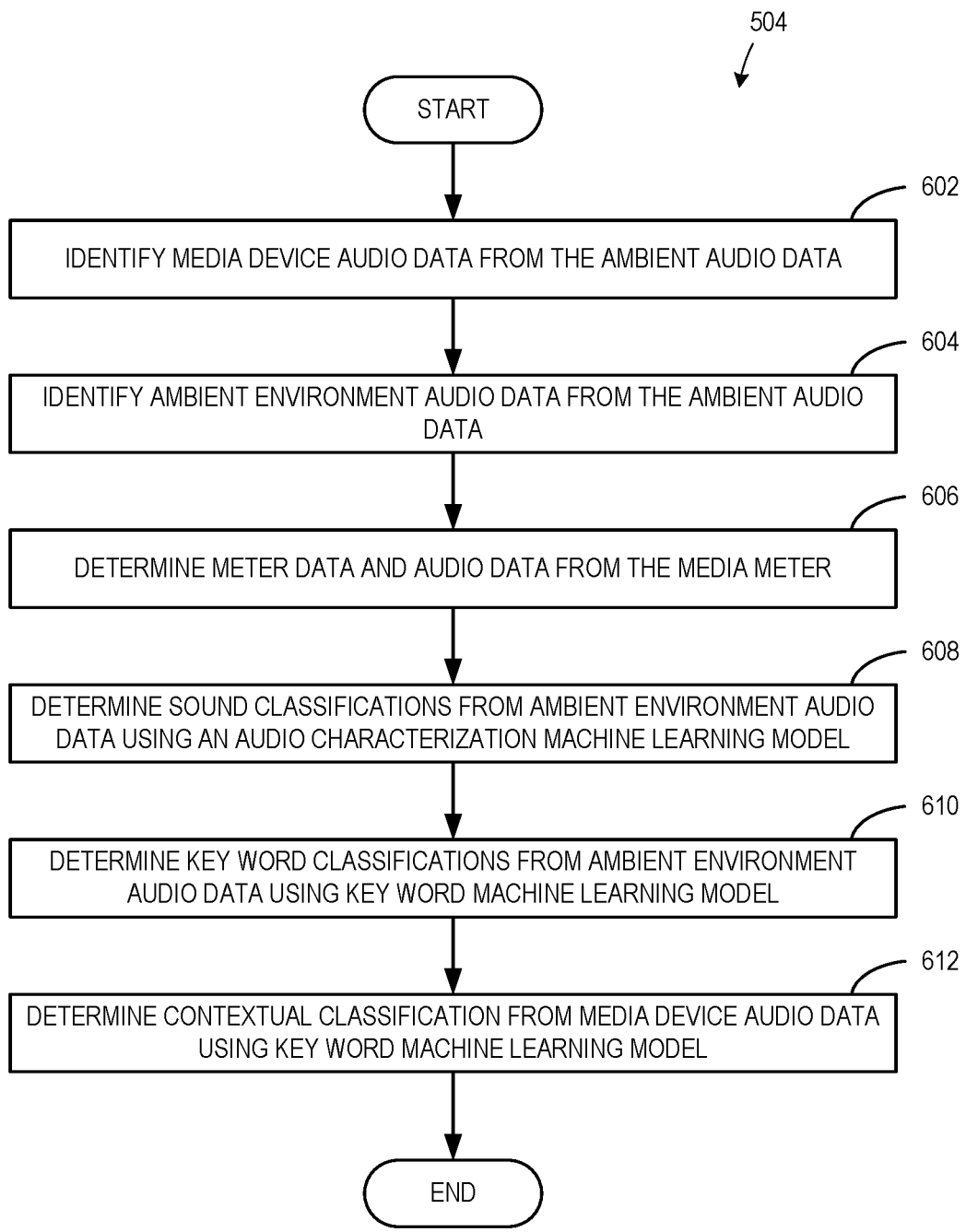
FIG. 6 is a flowchart representative of example machine readable instructions and/or example operations that may be executed by example processor circuitry to implement the example audio collector, the example meter data determination circuitry, the example audio characterization model controller, and the example key word model controller of FIG. 3.
Figure 7:
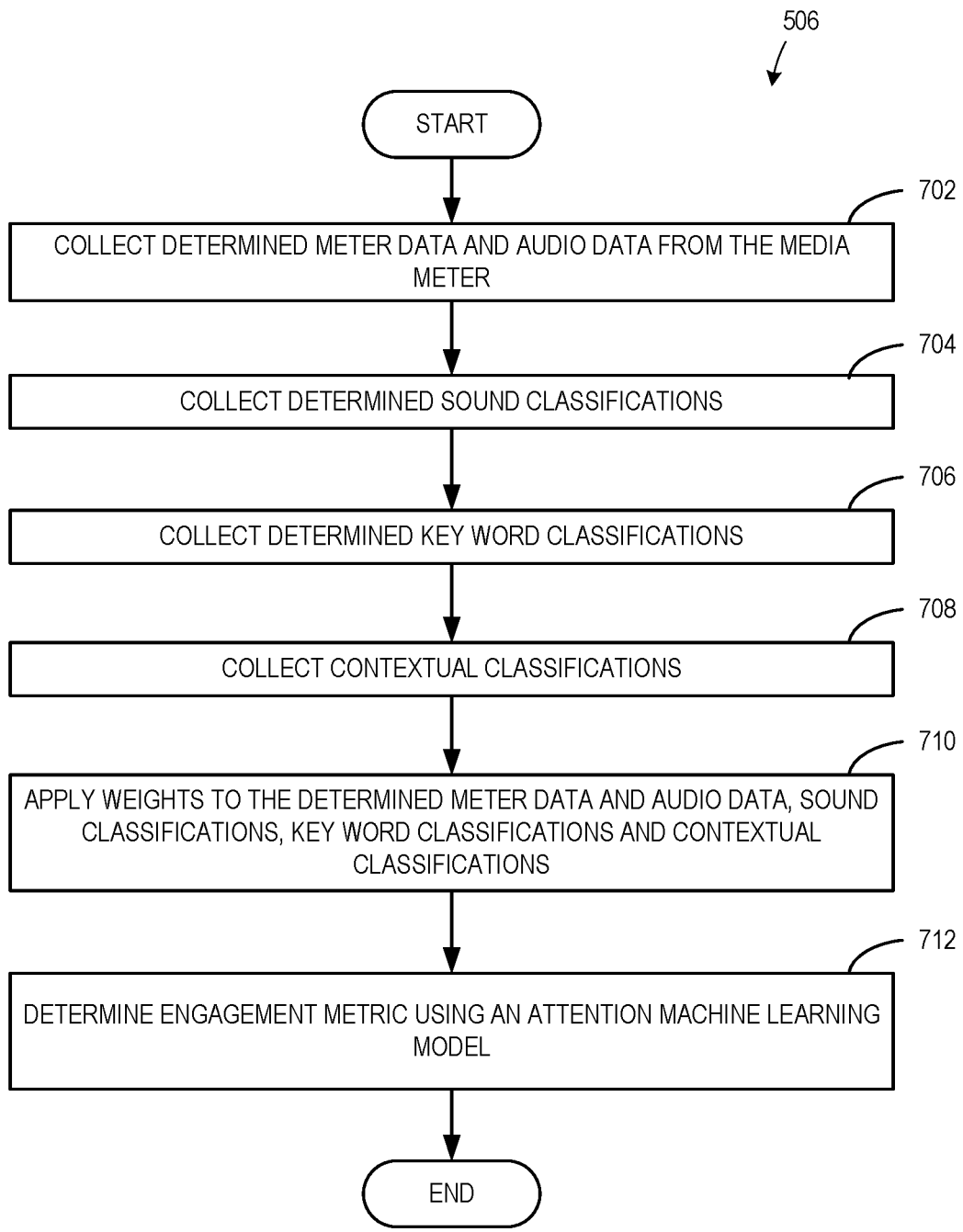
FIG. 7 is a flowchart representative of example machine readable instructions and/or example operations that may be executed by example processor circuitry to implement the example attention model controller and the example score determination circuitry of FIG. 3.

At block 504, the example attention determination circuitry 206 determines classification(s) for the ambient audio data. As described in further detail below, the example flowchart 504 of FIG. 6 represents example instructions that may be implemented to determine classification(s) for the ambient audio data. At block 506, the example score determination circuitry 316 calculates an engagement metric based on the classification(s). As described in further detail below, the example flowchart 506 of FIG. 7 represents example instructions that may be implemented to calculate the engagement metric based on the classification(s).

At block 508, the example score determination circuitry 316 determines if the engagement metric satisfies a threshold. The example score determination circuitry 316 determines whether the at least one individual (panelist) associated with the meter 114 is engaged with media presented on a media device (e.g., the media device 110) based on the engagement metric. In some examples, the engagement metric is a probability score that ranges from 0 to N (where N is a number). In such examples, the score determination circuitry 316 determines if the engagement metric satisfies a threshold. In some examples, the threshold is a number, percentage, etc., such as 0.7 for a probability, 70% for a percentage, etc. If the example score determination circuitry 316 determines the engagement metric satisfies the threshold, then process 500 continues to block 510 at which the example score determination circuitry 316 determines the user is engaged with the media. If the example score determination circuitry 316 determines the engagement metric does not satisfy the threshold, then process 500 continues to block 512, the example score determination circuitry 316 determines the user is not engaged with the media. At block 514, the example score determination circuitry 316 transmits media monitoring information and the engagement information. The example score determination circuitry 316 transmits the engagement information to the example central facility 116 of FIG. 1 via the example network communication circuitry 214 of FIG. 2. At block 514, process 500 ends.

FIG. 6 is a flowchart representative of example machine readable instructions and/or example operations 504 that may be executed and/or instantiated by processor circuitry to implement the example audio collector 302, the example meter data determination circuitry 304, the example audio characterization model controller 306, and the example key word model controller 310 of FIG. 3. The machine readable instructions and/or the operations 504 of FIG. 6 begin at block 602, at which the example audio collector 302 identifies media device audio data from the ambient audio data. In some examples, the audio collector 302 determines the media device audio data from the audio data collected by the media device meter 102. For example, the media device meter 102 obtains the media device audio data in the audio data collected from the example media device 110.

At block 604, the example audio collector 302 identifies ambient environment audio data from the ambient audio data. In some examples, the audio collector 302 can apply one or more adaptive gain control and/or adaptive filtering techniques to the audio data from the media device meter 102 and the audio data from the meter 114. In some examples, the audio collector 302 compares the audio data from the media device meter 102 and the audio data from the meter 114 (e.g., after applying the adaptive gain control and/or adaptive filtering techniques) to determine the ambient environment audio data. For example, the audio collector 302 may subtract the audio data collected by the media device meter 102 (e.g., including the audio data from the media device 110) from the audio data collected by the meter 114 (e.g., including a sum of the audio data from the media device 110 and the ambient audio data from the media presentation environment 104) to isolate the ambient environment audio data. In such examples, the audio collector 302 subtracts the audio data from the media device 110 collected by the media device meter 102 from the combination (sum) of the audio data from the media device 110 and the ambient audio data from the media presentation environment 104 collected by the meter 114 to isolate the ambient environment audio data.

At block 606, the example meter data determination circuitry 304 determines meter data and audio data from the media meter. In some examples, the meter data determination circuitry 304 obtains meter data from the meter 114 and the media device meter 102. For example, the meter 114 may include a motion sensor (e.g., an accelerometer) to determine if the meter 114 is moving (e.g., the associated panelist is moving around during the media presentation in the media presentation environment 104). In some examples, the media device meter 102 may include a sensor to determine the audio volume from the media device 110 (e.g., was the audio volume turned up, was the audio volume turned down, was the audio volume muted, etc.).

At block 608, the example audio characterization model controller 306 determines sound classifications from ambient environment audio data using an audio characterization machine learning model. The example audio characterization model controller 306 uses the audio characterization machine learning model to determine the sound classifications of the ambient environment audio data. In some examples, the audio characterization model controller 306 processes the ambient environment audio data with the audio characterization machine learning model to determine the one or more sound classifications. In examples disclosed herein, the one or more sound classifications include laughing, eating, drinking, snoring, vacuum cleaning, walking, etc. The example audio characterization model controller 306 obtains a library of sounds from an example audio database 308. The example audio database 308 includes a library of sounds and associated classifications (e.g., laughing, eating, drinking, snoring, vacuum cleaning, walking, etc.). The example audio characterization model controller 306 processes the ambient environment audio data using the audio characterization machine learning model to compare the ambient environment audio data to the library of sounds in the audio database 308 to determine matches between the ambient environment audio data and the library of sounds. In some examples, the audio characterization model controller 306 identifies the sounds classifications of the matches between the ambient environment audio data and the library of sounds based on the associated classifications in the audio database 308.

At block 610, the example key word model controller 310 determines key word classifications from the ambient environment audio data using a key word machine learning model. The example key word model controller 310 processes the ambient environment audio data and the media device audio data identified by the example audio collector 302 using a key word machine learning model. The example key word model controller 310 processes the ambient environment audio data using the key word machine learning model to determine key word classifications from the ambient environment (e.g., the media presentation environment 104 of FIG. 1). The example key word model controller 310 obtains a library of key words from an example key word database 312. The example key word database 312 includes a library of key words and associated classifications. For example, the key word database 312 can include key words associated with actions for the media device (e.g., "turn it down," "pause," "turn it off" etc.), key words associated reactions (e.g., "that was funny," "that is sad," etc.). The example key word model controller 310 processes the ambient environment audio data using the key word machine learning model to compare the ambient environment audio data to the library of key words in the key word database 312 to determines matches between the ambient environment audio data and the library of key words. In some examples, the key word model controller 310 identifies key word classifications of the matches between the ambient environment audio data and the library of key words based on the associated classifications in the key word database 312.

At block 612, the example key word model controller 310 determines contextual classification from the media device audio data using the key word machine learning model. The example key word model controller 310 processes the media device audio data to determine contextual classifications from the media presented on the media device (e.g., the media device 110 of FIG. 1). In some examples, the key word model controller 310 identifies key words in the media device audio data using the library of key words in the example key word database 312. The key word model controller 310 processes the media device audio data using the key word machine learning model to determine contextual classification from the key words identified in the media device audio data. For example, the key word model controller 310 may determine contextual classifications related to the genre of the media (e.g., comedy, horror, romance, etc.), actions in a scene of the media (e.g., a flight scene, two characters having a conversation, etc.), etc. In some examples, the key word model controller 310 determines the contextual classifications using the key word machine learning model for comparison to the determined key word classifications of the ambient environment audio data. After block 612, process 504 completes and returns to process 500 of FIG. 5.

FIG. 7 is a flowchart representative of example machine readable instructions and/or example operations 506 that may be executed and/or instantiated by processor circuitry to implement the example attention model controller 314 and the example score determination circuitry 316 of FIG. 3. The machine readable instructions and/or the operations 506 of FIG. 7 begin at block 702, at which the example attention model controller 314 collects the determined meter data and audio data from the media meter. At block 704, the example attention model controller 314 collects the determined sound classifications. At block 706, the example attention model controller 314 collects the determined key word classifications. At block 708, the example attention model controller 314 collects the contextual classifications. The example attention model controller 314 collects the determined meter data and audio data from the meter data determination circuitry 304, the determined sound classifications from the audio characterization model controller 306, and the determined key word classifications and contextual classifications from the key word model controller 310.

At block 710, the example attention model controller 314 applies weights to the determined meter data and audio data, the sound classifications, the key word classifications, and the contextual classifications. The example attention model controller 314 applies weights to the determined classification data (e.g., the meter data and audio data, the sound classifications, the key word classifications, and the contextual classifications). In some examples, the attention model controller 314 applies different weighting factors to the different classifications for calculating the engagement metric. For example, different sounds classifications may have different associated weights (e.g., a sound classification of "laughter" may have a different weight than a sound classification of "vacuum cleaning" during media exposure). In other examples, the combination of different classifications may have different associated weights. For example, a sound classification of "laughter" during a media exposure with a contextual classification of "comedy" may have a higher weighting factor to indicate a high likelihood the panelist is engaged during the media exposure. In another example, a key word classification of a panelist talking with key word related to the contextual classification of the media content may have a higher weighting factor to indicate a high likelihood the panelist is engaged during the media exposure. The example attention model controller 314 combines the determined classification data (e.g., the meter data and audio data, the sound classifications, the key word classifications, and the contextual classifications) to apply different weighting factors to the classification data for determining the engagement metric. The example attention model controller 314 also generates an attention machine learning model for processing the classification data.

At block 712, the example score determination circuitry 316 determines the engagement metric using an attention machine learning model. The example score determination circuitry 316 calculates the engagement metric for panelist(s) that identifies the likelihood the panelist(s) were engaged/paying attention to the media exposure. The example score determination circuitry 316 processes the weighted classification data with the attention machine learning model generated by the example attention model controller 314 to calculate the engagement metric. The example score determination circuitry 316 calculates the engagement metric based on the classification data (e.g., the meter data and audio data, the sound classifications, the key word classifications, and the contextual classifications) weighted by the example attention model controller 314. In examples disclosed herein, the engagement metric (e.g., a score) is a measure of a probability of attentiveness for the associated panelist(s) during exposure to media content. For example, the engagement metric can be a probability score that ranges from 0 to N (where N is a number, percentage, etc., such as 1 for a probability, 100% for a percentage, etc.). In some examples, the engagement metric can be a binary score (e.g., 0 or 1, engaged or not engaged, etc.). The example engagement metric is output from the attention machine learning model after the score determination circuitry 316 processed the weighted classification data. After block 712, process 506 completes and returns to process 500 of FIG. 5.

Figure 8:
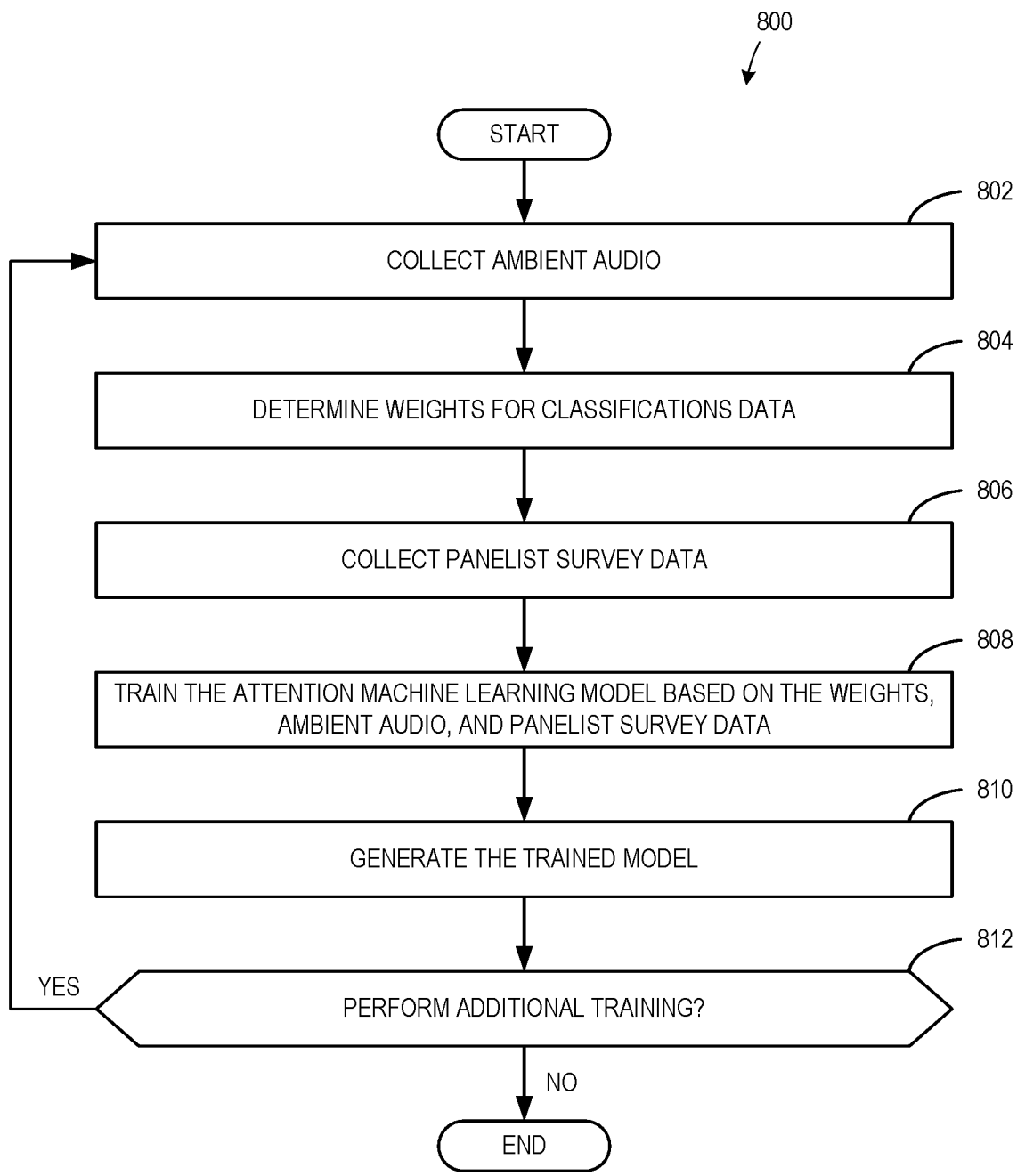
FIG. 8 is a flowchart representative of example machine readable instructions and/or example operations that may be executed by example processor circuitry to implement the example attention model controller of FIG. 4.

FIG. 8 is a flowchart representative of example machine readable instructions and/or example operations 800 that may be executed and/or instantiated by processor circuitry to implement the example attention model controller 314 of FIG. 4. The machine readable instructions and/or the operations 800 of FIG. 8 begin at block 802, at which the example model trainer 404 collects ambient audio. The example model trainer also collects ambient audio data collected from the media presentation environment 104 (e.g., via the audio collector 302 of FIG. 3). At block 804, the example weights determination circuitry 402 determines weights for the classification data. The example weights determination circuitry 402 determines different weights based on classification data (e.g., the meter data and audio data, the sound classifications, the key word classifications, and the contextual classifications) collected by the example attention model controller 314 over time. In some examples, the weights determination circuitry 402 determines weighting factors for each of the different classifications data (e.g., the meter data and audio data, the sound classifications, the key word classifications, and the contextual classifications) based on the historical classification data collected by the attention model controller 314.

At block 806, the example model trainer 404 collects panelist survey data. The example model trainer 404 collects reported panelist survey data from the example panelist survey database 406 associated with the timestamps (e.g., day and time) of the collected ambient audio data. In some examples, the panelist survey data includes panelist answers as to whether they were paying attention to the media presentation at a specific day and time. At block 808, the example model trainer 404 trains the attention machine learning model based on the weights, the ambient audio, and the panelist survey data. The model trainer 404 operates in a training mode where it receives multiple instances of weights and ambient audio data, generates a prediction, and outputs an attention machine learning model based on that prediction. For the example model trainer 404 to generate an attention machine learning model, the model trainer 404 receives weights corresponding to actual representations of classification data (e.g., the meter data and audio data, the sound classifications, the key word classifications, and the contextual classifications) of ambient audio data from the media presentation environment 104. The example model trainer 404 uses the panelist survey data as a source of truth to train the attention machine learning models by comparing the panelist survey data to the ambient audio data collected at the same timestamps. The example model trainer 404 trains the attention machine learning model with a combination of (i) sensed ambient audio data collected by a media device meter (e.g., the media device meter 102 and the meter 114 of FIG. 1) and (ii) panelist survey data that is time aligned with the sensed ambient audio data. For example, during a training mode, verifications are made about the engagement information for panelist(s) in the media presentation environment 104 (e.g., answers included in the panelist survey data) so that the engagement data provided is suitable for learning. For example, the model trainer 404 receives weights indicative of the weights to apply to actual ambient audio data from the media presentation environment 104 and identifies a pattern in the weights that maps the ambient audio data of the actual media presentation environment 104 to the engagement information from the panelist(s) in the panelist survey data and outputs a model that captures these daily and/or weekly patterns.

At block 810, the example model generator 408 generates the trained attention machine learning model. For example, the model generator 408 may receive a notification from the model trainer 404 that a new and/or updated attention machine learning model has been trained and the model generator 408 may create a file in which the attention machine learning model is published so that the attention machine learning model can be saved and/or stored as the file. In some examples, the model generator 408 provides a notification to the score determination circuitry 316 of FIG. 3 that an attention machine learning model is ready to be used for processing the classification data.

At block 812, the example model generator 408 determines whether to perform additional training. In some examples, the weight determination circuitry 402 updates the determined weights/weighting factors over time as more ambient audio data and panelist survey data are collected, and the model trainer 404 updates the attention machine learning model. If the example model generator 408 performs additional training, then process 800 returns to block 802 at which the example model trainer 404 collects ambient audio. If the example model generator 408 does not perform additional training, then process 800 ends.

Figure 9:
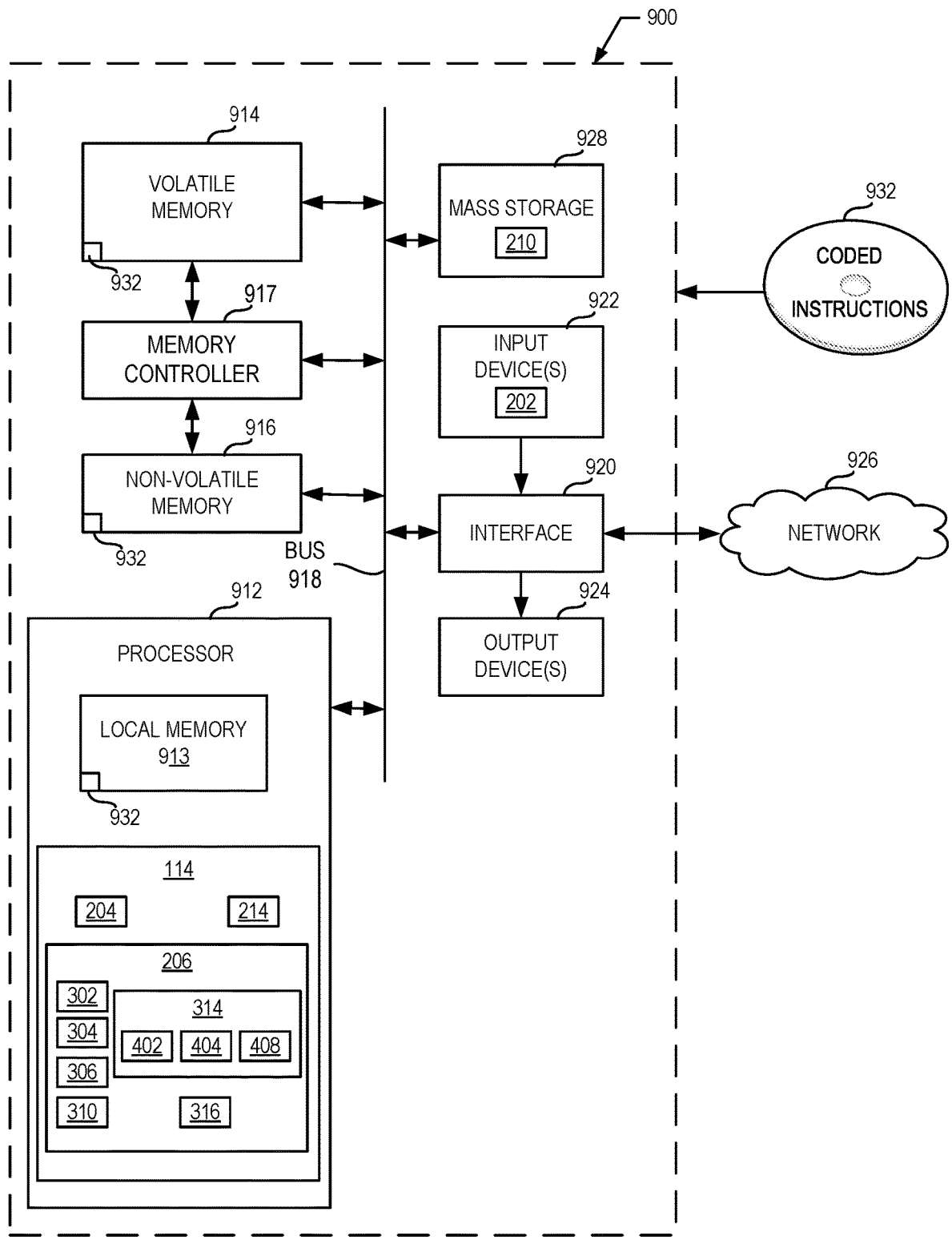
FIG. 9 is a block diagram of an example processing platform including processor circuitry structured to execute the example machine readable instructions and/or the example operations of FIGS. 5-8 to implement the example meter 114 of FIGS. 1-4.

FIG. 9 is a block diagram of an example processor platform 900 structured to execute and/or instantiate the machine readable instructions and/or the operations of FIGS. 5-8 to implement the example meter 114 of FIGS. 1-4. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example A/D converter 204, the example attention determination circuitry 206, the example network communication circuitry 214, the example audio collector 302, the example meter data determination circuitry 304, the example audio characterization model controller 306, the example key word model controller 310, the example attention model controller 314, the example score determination circuitry 316, the example weights determination circuitry 402, the example model trainer 404, and the example model generator 408.

The processor circuitry 912 of the illustrated example includes a local memory 913 (e.g., a cache, registers, etc.).

The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 932, which may be implemented by the machine readable instructions of FIGS. 5-8, may be stored in the mass storage device 928, in the volatile memory 914, in the non-volatile memory 916, and/or on a removable non-transitory computer readable storage medium such as a CD or DVD.

Figure 10:
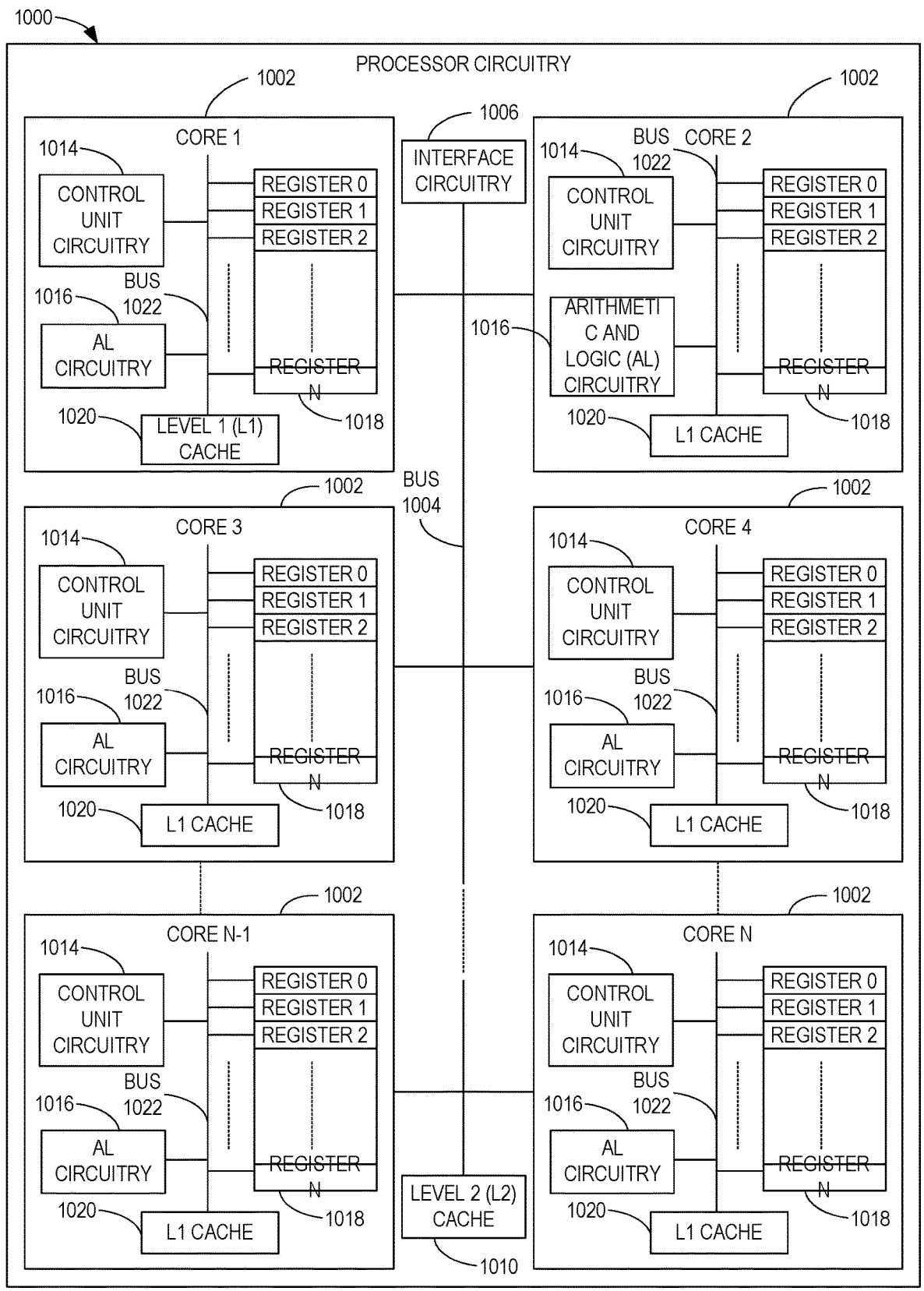
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a general purpose microprocessor 1000. The general purpose microprocessor circuitry 1000 executes some or all of the machine readable instructions of the flowcharts of FIGS. 5-8 to effectively instantiate the circuitry of FIG. 2 as logic circuits to perform the operations corresponding to those machine readable instructions. In some such examples, the circuitry of FIGS. 2-4 are instantiated by the hardware circuits of the microprocessor 1000 in combination with the instructions. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 5-8.

The cores 1002 may communicate by a first example bus 1004. In some examples, the first bus 1004 may implement a communication bus to effectuate communication associated with one(s) of the cores 1002. For example, the first bus 1004 may implement at least one of an Inter-Integrated Circuit (I2C) bus, a Serial Peripheral Interface (SPI) bus, a PCI bus, or a PCIe bus. Additionally or alternatively, the first bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_ cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMS s), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
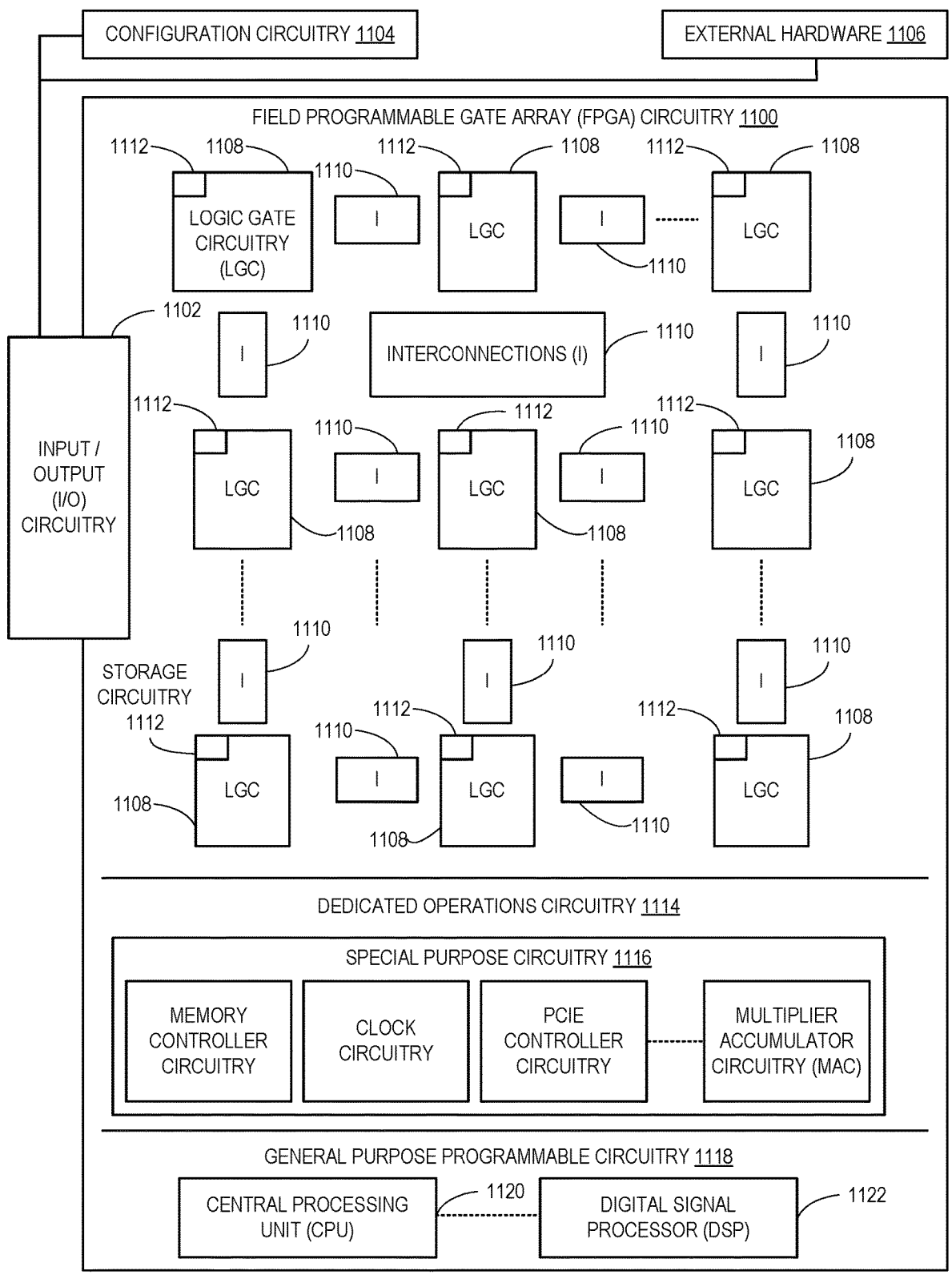
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 5-8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 5-8. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 5-8. As such, the FPGA circuitry 1100 may be structured to effectively instantiate some or all of the machine readable instructions of the flowcharts of FIGS. 5-8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 5-8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIGS. 5-8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 5-8 may be executed by one or more of the cores 1002 of FIG. 10, a second portion of the machine readable instructions represented by the flowcharts of FIGS. 5-8 may be executed by the FPGA circuitry 1100 of FIG. 11, and/or a third portion of the machine readable instructions represented by the flowcharts of FIGS. 5-8 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
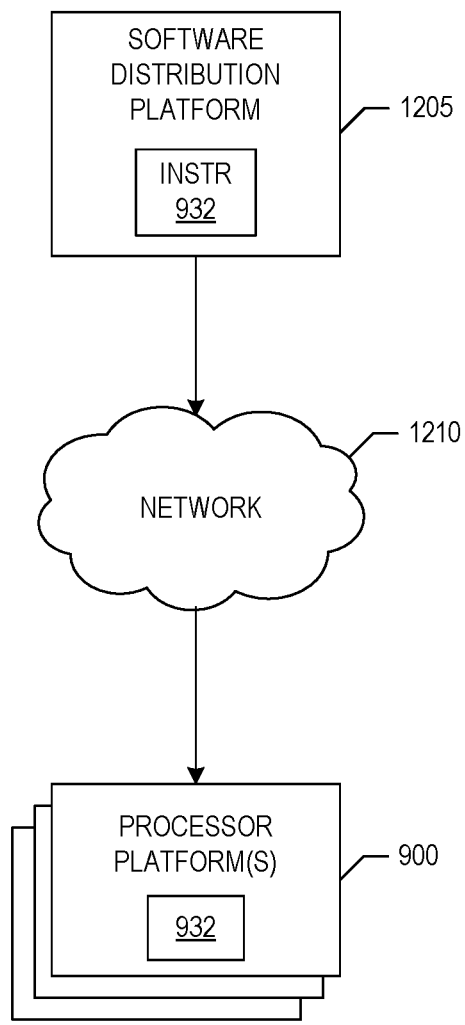
FIG. 12 is a block diagram of an example software distribution platform (e.g., one or more servers) to distribute software (e.g., software corresponding to the example machine readable instructions of FIGS. 5-8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions 500 of FIG. 5, the example machine readable instructions 504 of FIG. 6, the example machine readable instructions 506 of FIG. 7, and the example machine readable instructions 800 of FIG. 8, as described above. The one or more servers of the example software distribution platform 1205 are in communication with a network 1210, which may correspond to any one or more of the Internet and/or any of the example network 926 of FIG. 9 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 500 of FIG. 5, the example machine readable instructions 504 of FIG. 6, the example machine readable instructions 506 of FIG. 7, and the example machine readable instructions 800 of FIG. 8, may be downloaded to the example processor platform 900, which is to execute the machine readable instructions 932 to implement the example attention determination circuitry 206. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that measure engagement of media consumers based on acoustic environment. Disclosed systems, methods, apparatus, and articles of manufacture improve the efficiency of using a computing device by training and using a heuristic machine learning engine to determine an engagement metrics for media consumers based on the ambient audio data present in the environment during a media presentation event. The disclosed systems, methods, apparatus, and articles of manufacture identify classifications for the ambient audio data (e.g., sound classifications, conversational classifications, key word classifications, contextual classifications, etc.) and use a machine learning engine to predict an engagement metric form the media consumers based on the classifications. The disclosed example methods, apparatus and articles of manufacture improve the efficiency of using a computing device by determining user engagement with media using a heuristic machine learning engine that analyzes the ambient audio data of the environment. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to measure engagement of media consumers based on acoustic environment are disclosed herein. Further examples and combinations thereof include the following:

Example 1 includes an apparatus comprising at least one memory, instructions, and processor circuitry to execute the instructions to identify media device audio data and ambient environment audio data from sensed audio data collected from an environment, determine classification data for the media device audio data and the ambient environment audio data, process the classification data with a machine learning model to calculate an engagement metric, and determine whether at least one individual is engaged with media in the environment based on the engagement metric.

Example 2 includes the apparatus of example 1, wherein the processor circuitry is to obtain the sensed audio data from a first meter and a second meter, the first meter and the second meter to monitor a media device in the environment.

Example 3 includes the apparatus of example 2, wherein the processor circuitry is to obtain meter data from the first meter and the second meter, the meter data including at least one of motion data or audio volume, and the processor circuitry is to determine the engagement metric based on the meter data.

Example 4 includes the apparatus of example 1, wherein the machine learning model is a first machine learning model, and to determine the classification data, the processor circuitry is to process the ambient environment audio data with a second machine learning model to determine one or more sound classifications, process the ambient environment audio data with a third machine learning model to determine key word classifications, and process the media device audio data with the third machine learning model to determine contextual classifications.

Example 5 includes the apparatus of example 4, wherein the sound classifications are based on a library of sounds corresponding to at least one of laughing, eating, drinking, snoring, vacuum cleaning, or walking.

Example 6 includes the apparatus of example 4, wherein the processor circuitry is to execute the second machine learning model and the third machine learning model concurrently.

Example 7 includes the apparatus of example 1, wherein the processor circuitry is to apply weights to the classification data.

Example 8 includes the apparatus of example 7, wherein the processor circuitry is to process the weighted classification data with the machine learning model to calculate the engagement metric.

Example 9 includes the apparatus of example 1, wherein the processor circuitry is to train the machine learning model based on a combination of (i) second sensed audio data collected by a media device meter and (ii) panelist survey data that is time aligned with the second sensed audio data.

Example 10 includes the apparatus of example 1, wherein the processor circuitry is to determine whether the at least one individual is engaged with the media in the environment based on whether the engagement metric satisfies a threshold.

Example 11 includes At least one non-transitory computer readable medium comprising instructions which, when executed, cause one or more processors to at least identify media device audio data and ambient environment audio data from sensed audio data collected from an environment, determine classification data for the media device audio data and the ambient environment audio data, process the classification data with a machine learning model to calculate an engagement metric, and determine whether at least one individual is engaged with media in the environment based on the engagement metric.

Example 12 includes the at least one non-transitory computer readable medium of example 11, wherein the instructions are to cause the one or more processors to obtain the sensed audio data from a first meter and a second meter, the first meter and the second meter to monitor a media device in the environment.

Example 13 includes the at least one non-transitory computer readable medium of example 12, wherein the instructions are to cause the one or more processors to obtain meter data from the first meter and the second meter, the meter data including at least one of motion data or audio volume, and determine the engagement metric based on the meter data.

Example 14 includes the at least one non-transitory computer readable medium of example 11, wherein the machine learning model is a first machine learning model, and the instructions are to cause the one or more processors to determine the classification data by processing the ambient environment audio data with a second machine learning model to determine one or more sound classifications, processing the ambient environment audio data with a third machine learning model to determine key word classifications, and processing the media device audio data with the third machine learning model to determine contextual classifications.

Example 15 includes the at least one non-transitory computer readable medium of example 14, wherein the sound classifications are based on a library of sounds corresponding to at least one of laughing, eating, drinking, snoring, vacuum cleaning, or walking.

Example 16 includes the at least one non-transitory computer readable medium of example 14, wherein the instructions are to cause the one or more processors to execute the second machine learning model and the third machine learning model concurrently.

Example 17 includes the at least one non-transitory computer readable medium of example 11, wherein the instructions are to cause the one or more processors to apply weights to the classification data.

Example 18 includes the at least one non-transitory computer readable medium of example 17, wherein the instructions are to cause the one or more processors to process the weighted classification data with the machine learning model to calculate the engagement metric.

Example 19 includes the at least one non-transitory computer readable medium of example 11, wherein the instructions are to cause the one or more processors to train the machine learning model based on a combination of (i) second sensed audio data collected by a media device meter and (ii) panelist survey data that is time aligned with the second sensed audio data.

Example 20 includes the at least one non-transitory computer readable medium of example 1, wherein the instructions are to cause the one or more processors to determine whether the at least one individual is engaged with the media in the environment based on whether the engagement metric satisfies a threshold.

Example 21 includes a method comprising identifying media device audio data and ambient environment audio data from sensed audio data collected from an environment, determining, by executing an instruction with at least one processor, classification data for the media device audio data and the ambient environment audio data, processing the classification data with a machine learning model to calculate an engagement metric, and determining, by executing an instruction with the at least one processor, whether at least one individual is engaged with media in the environment based on the engagement metric.

Example 22 includes the method of example 21, further including obtaining the sensed audio data from a first meter and a second meter, the first meter and the second meter to monitor a media device in the environment.

Example 23 includes the method of example 22, further including obtaining meter data from the first meter and the second meter, the meter data including at least one of motion data or audio volume, wherein the engagement metric is based on the meter data.

Example 24 includes the method of example 21, wherein the machine learning model is a first machine learning model, and the determining of the classification data includes processing the ambient environment audio data with a second machine learning model to determine one or more sound classifications, processing the ambient environment audio data with a third machine learning model to determine key word classifications, and processing the media device audio data with the third machine learning model to determine contextual classifications.

Example 25 includes the method of example 24, wherein the sound classifications are based on a library of sounds corresponding to at least one of laughing, eating, drinking, snoring, vacuum cleaning, or walking.

Example 26 includes the method of example 24, further including executing the second machine learning model and the third machine learning model concurrently.

Example 27 includes the method of example 21, further including applying weights to the classification data.

Example 28 includes the method of example 27, wherein the processing of the classification data includes processing the weighted classification data with the machine learning model to calculate the engagement metric.

Example 29 includes the method of example 21, further including training the machine learning model based on a combination of (i) second sensed audio data collected by a media device meter and (ii) panelist survey data that is time aligned with the second sensed audio data.

Example 30 includes the method of example 21, wherein the determining of whether the at least one individual is engaged with the media in the environment is based on whether the engagement metric satisfies a threshold.

Example 31 includes an apparatus comprising an audio collector to identify media device audio data and ambient environment audio data from sensed audio data collected from an environment, and score determination circuitry to process classification data with a machine learning model to calculate an engagement metric, the classification data determined for the media device audio data and the ambient environment audio data, and determine whether at least one individual is engaged with media in the environment based on the engagement metric.

Example 32 includes the apparatus of example 31, wherein the audio collector is to obtain the sensed audio data from a first meter and a second meter, the first meter and the second meter to monitor a media device in the environment.

Example 33 includes the apparatus of example 32, further including meter data determination circuitry to obtain meter data from the first meter and the second meter, the meter data including at least one of motion data or audio volume, and the score determination circuitry is to determine the engagement metric based on the meter data.

Example 34 includes the apparatus of example 31, wherein the machine learning model is a first machine learning model, and further including an audio characterization model controller to process the ambient environment audio data with a second machine learning model to determine one or more sound classifications, and a key word model controller to process the ambient environment audio data with a third machine learning model to determine key word classifications, and process the media device audio data with the third machine learning model to determine contextual classifications.

Example 35 includes the apparatus of example 34, wherein the classification data includes the one or more sound classifications, the key word classifications, and the contextual classifications, and wherein the sound classifications are based on a library of sounds corresponding to at least one of laughing, eating, drinking, snoring, vacuum cleaning, or walking.

Example 36 includes the apparatus of example 34, wherein the audio characterization model controller is to execute the second machine learning model and the key word model controller is to execute the third machine learning model concurrently.

Example 37 includes the apparatus of example 31, further including an attention model controller to apply weights to the classification data.

Example 38 includes the apparatus of example 37, wherein the score determination circuitry is to process the weighted classification data with the machine learning model to calculate the engagement metric.

Example 39 includes the apparatus of example 31, further including an attention model controller to train the machine learning model based on a combination of (i) second sensed audio data collected by a media device meter and (ii) panelist survey data that is time aligned with the second sensed audio data.

Example 40 includes the apparatus of example 31, wherein the score determination circuitry is to determine whether the at least one individual is engaged with the media in the environment based on whether the engagement metric satisfies a threshold.

Example 41 includes an apparatus comprising means for identifying media device audio data and ambient environment audio data from sensed audio data collected from an environment, and means for determining an engagement metric, the means for determining to process classification data with a machine learning model to calculate the engagement metric, the classification data determined for the media device audio data and the ambient environment audio data, and determine whether at least one individual is engaged with media in the environment based on the engagement metric.

Example 42 includes the apparatus of example 41, wherein the means for identifying is to obtain the sensed audio data from a first meter and a second meter, the first meter and the second meter to monitor a media device in the environment.

Example 43 includes the apparatus of example 42, further including means for obtaining meter data from the first meter and the second meter, the meter data including at least one of motion data or audio volume, and the means for determining is to determine the engagement metric based on the meter data.

Example 44 includes the apparatus of example 41, wherein the machine learning model is a first machine learning model, and further including first means for processing the ambient environment audio data with a second machine learning model to determine one or more sound classifications, and second means for processing a third machine learning model, the second means for processing to process the ambient environment audio data with the third machine learning model to determine key word classifications, and process the media device audio data with the third machine learning model to determine contextual classifications.

Example 45 includes the apparatus of example 44, wherein the classification data includes the one or more sound classifications, the key word classifications, and the contextual classifications, and wherein the sound classifications are based on a library of sounds corresponding to at least one of laughing, eating, drinking, snoring, vacuum cleaning, or walking.

Example 46 includes the apparatus of example 44, wherein the first means for processing is to execute the second machine learning model and the second means for processing is to execute the third machine learning model concurrently.

Example 47 includes the apparatus of example 41, further including means for applying weights to the classification data.

Example 48 includes the apparatus of example 47, wherein the means for determining is to process the weighted classification data with the machine learning model to calculate the engagement metric.

Example 49 includes the apparatus of example 41, further including means for training the machine learning model based on a combination of (i) second sensed audio data collected by a media device meter and (ii) panelist survey data that is time aligned with the second sensed audio data.

Example 50 includes the apparatus of example 41, wherein the means for determining is to determine whether the at least one individual is engaged with the media in the environment based on whether the engagement metric satisfies a threshold.

Example 51 includes an apparatus comprising at least one memory, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate an audio collector to identify media device audio data and ambient environment audio data from sensed audio data collected from an environment, and score determination circuitry to process classification data with a machine learning model to calculate an engagement metric, the classification data determined for the media device audio data and the ambient environment audio data, and determine whether at least one individual is engaged with media in the environment based on the engagement metric.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A computing system comprising:
a processor; and
a memory storing instructions that, upon execution by the processor, cause the computing system to perform operations comprising:
identifying media device audio data and ambient environment audio data from sensed audio data collected from a media exposure environment where a consumer is exposed to media through a media device;
determining classification data for the media device audio data and the ambient environment audio data;
processing the classification data with a machine learning model to calculate an engagement metric, wherein the machine learning model is trained based on a combination of (i) second sensed audio data collected by a media device meter and (ii) panelist survey data that is time aligned with the second sensed audio data; and
determining whether the consumer is paying attention to media presentation through the media device in the media exposure environment based on the engagement metric.

2. The computing system of claim 1, wherein the operations further comprise:
obtaining the sensed audio data from a first meter and a second meter, the first meter and the second meter to monitor the media device in the media exposure environment.

3. The computing system of claim 2, wherein the operations further comprise:
obtaining meter data from the first meter and the second meter, the meter data including at least one of motion data or audio volume, and
determining the engagement metric based on the meter data.

4. The computing system of claim 1, wherein the machine learning model is a first machine learning model, and wherein determining the classification data comprises:
processing the ambient environment audio data with a second machine learning model to determine one or more sound classifications;
processing the ambient environment audio data with a third machine learning model to determine key word classifications; and
processing the media device audio data with the third machine learning model to determine contextual classifications.

5. The computing system of claim 4, wherein the sound classifications are based on a library of sounds corresponding to at least one of laughing, eating, drinking, snoring, vacuum cleaning, or walking.

6. The computing system of claim 4, wherein the operations further comprise:
executing the second machine learning model and the third machine learning model concurrently.

7. The computing system of claim 1, wherein the operations further comprise:
applying weights to the classification data.

8. The computing system of claim 7, wherein the operations further comprise:
processing the weighted classification data with the machine learning model to calculate the engagement metric.

9. The computing system of claim 1, wherein determining whether the consumer is paying attention to the media presentation in the media exposure environment comprises:
determining whether the consumer is paying attention based on whether the engagement metric satisfies a threshold.

10. A non-transitory computer readable storage medium comprising instructions which, when executed, cause one or more processors to perform operations comprising:
identifying media device audio data and ambient environment audio data from sensed audio data collected from a media exposure environment where a consumer is exposed to media through a media device;
determining classification data for the media device audio data and the ambient environment audio data;
processing the classification data with a machine learning model to calculate an engagement metric, wherein the machine learning model is trained based on a combination of (i) second sensed audio data collected by a media device meter and (ii) panelist survey data that is time aligned with the second sensed audio data; and
determining whether the consumer is paying attention to media presentation through the media device in the media exposure environment based on the engagement metric.

11. The non-transitory computer readable storage medium of claim 10, wherein the operations further comprise:
obtaining the sensed audio data from a first meter and a second meter, the first meter and the second meter to monitor a media device in the media exposure environment.

12. The non-transitory computer readable storage medium of claim 10, wherein the machine learning model is a first machine learning model, and wherein determining the classification data comprises:
processing the ambient environment audio data with a second machine learning model to determine one or more sound classifications;
processing the ambient environment audio data with a third machine learning model to determine key word classifications; and
processing the media device audio data with the third machine learning model to determine contextual classifications.

13. The non-transitory computer readable storage medium of claim 10, wherein the operations further comprise:
applying weights to the classification data.

14. The non-transitory computer readable storage medium of claim 13, wherein the operations further comprise:
processing the weighted classification data with the machine learning model to calculate the engagement metric.

15. The non-transitory computer readable storage medium of claim 10, wherein determining whether the consumer is paying attention to the media presentation through the media device in the media exposure environment comprises:
determining whether the consumer is paying attention based on whether the engagement metric satisfies a threshold.

16. A method comprising:
identifying media device audio data and ambient environment audio data from sensed audio data collected from a media exposure environment where a consumer is exposed to media through a media device;
determining, by at least one processor, classification data for the media device audio data and the ambient environment audio data;
processing the classification data with a machine learning model to calculate an engagement metric, wherein the machine learning model is trained based on a combination of (i) second sensed audio data collected by a media device meter and (ii) panelist survey data that is time aligned with the second sensed audio data; and
determining, by the at least one processor, whether the consumer is paying attention to media presentation through the media device in the media exposure environment based on the engagement metric.

17. The method of claim 16, wherein the machine learning model is a first machine learning model, and the determining of the classification data includes:
processing the ambient environment audio data with a second machine learning model to determine one or more sound classifications;
processing the ambient environment audio data with a third machine learning model to determine key word classifications; and
processing the media device audio data with the third machine learning model to determine contextual classifications.

18. The method of claim 16, further comprising:
transmitting, by the at least one processor, the engagement metric to a remote server.

* * * * *